United States Patent
Noda et al.

(10) Patent No.: US 9,575,295 B2
(45) Date of Patent: Feb. 21, 2017

(54) ZOOM LENS AND IMAGING APPARATUS

(71) Applicant: FUJIFILM Corporation, Tokyo (JP)

(72) Inventors: Taiga Noda, Saitama-ken (JP); Michio Cho, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/721,020

(22) Filed: May 26, 2015

(65) Prior Publication Data

US 2015/0370041 A1    Dec. 24, 2015

(30) Foreign Application Priority Data

Jun. 18, 2014   (JP) ................................ 2014-125253

(51) Int. Cl.
| | |
|---|---|
| *G02B 15/14* | (2006.01) |
| *G02B 13/00* | (2006.01) |
| *G02B 15/16* | (2006.01) |
| *G02B 9/00* | (2006.01) |
| *G02B 15/173* | (2006.01) |

(52) U.S. Cl.
CPC ............. *G02B 13/009* (2013.01); *G02B 9/00* (2013.01); *G02B 15/14* (2013.01); *G02B 15/16* (2013.01); *G02B 15/173* (2013.01)

(58) Field of Classification Search
CPC ....... G02B 13/009; G02B 15/14; G02B 15/15; G02B 15/16; G02B 15/20; G02B 15/22
USPC .................................. 359/676–679, 683–685
See application file for complete search history.

(56) References Cited

U.S. PATENT DOCUMENTS

| | | | |
|---|---|---|---|
| 2005/0162751 A1* | 7/2005 | Tochigi | ................ G02B 15/173 359/685 |
| 2014/0036136 A1 | 2/2014 | Kimura | |
| 2014/0368699 A1* | 12/2014 | Morooka | ........... H04N 5/23296 348/240.2 |

FOREIGN PATENT DOCUMENTS

| | | |
|---|---|---|
| JP | 2011-186454 | 9/2011 |
| JP | 2014-029375 | 2/2014 |

* cited by examiner

*Primary Examiner* — Darryl J Collins
(74) *Attorney, Agent, or Firm* — Young & Thompson

(57) ABSTRACT

A zoom lens includes, in order from the object side, a positive first group, a negative second group, a stop, a positive third group, a negative fourth group, and a positive fifth group. During magnification change from the wide-angle end to the telephoto end, the first to fourth groups are moved to always increase the distance between the first and second groups, always decrease the distance between the second and third groups, and change the distance between the third and fourth groups and the distance between the fourth and fifth groups. The third group includes, in order from the object side, at least a positive lens, a positive lens, a negative lens, and a positive lens, and satisfies condition expression (1) below:

$$25 < \nu dD - \nu dA < 70 \qquad (1),$$

where $\nu dA$ and $\nu dD$ are Abbe numbers at the d-line of the most object-side lens A and the most image-side lens D.

19 Claims, 12 Drawing Sheets

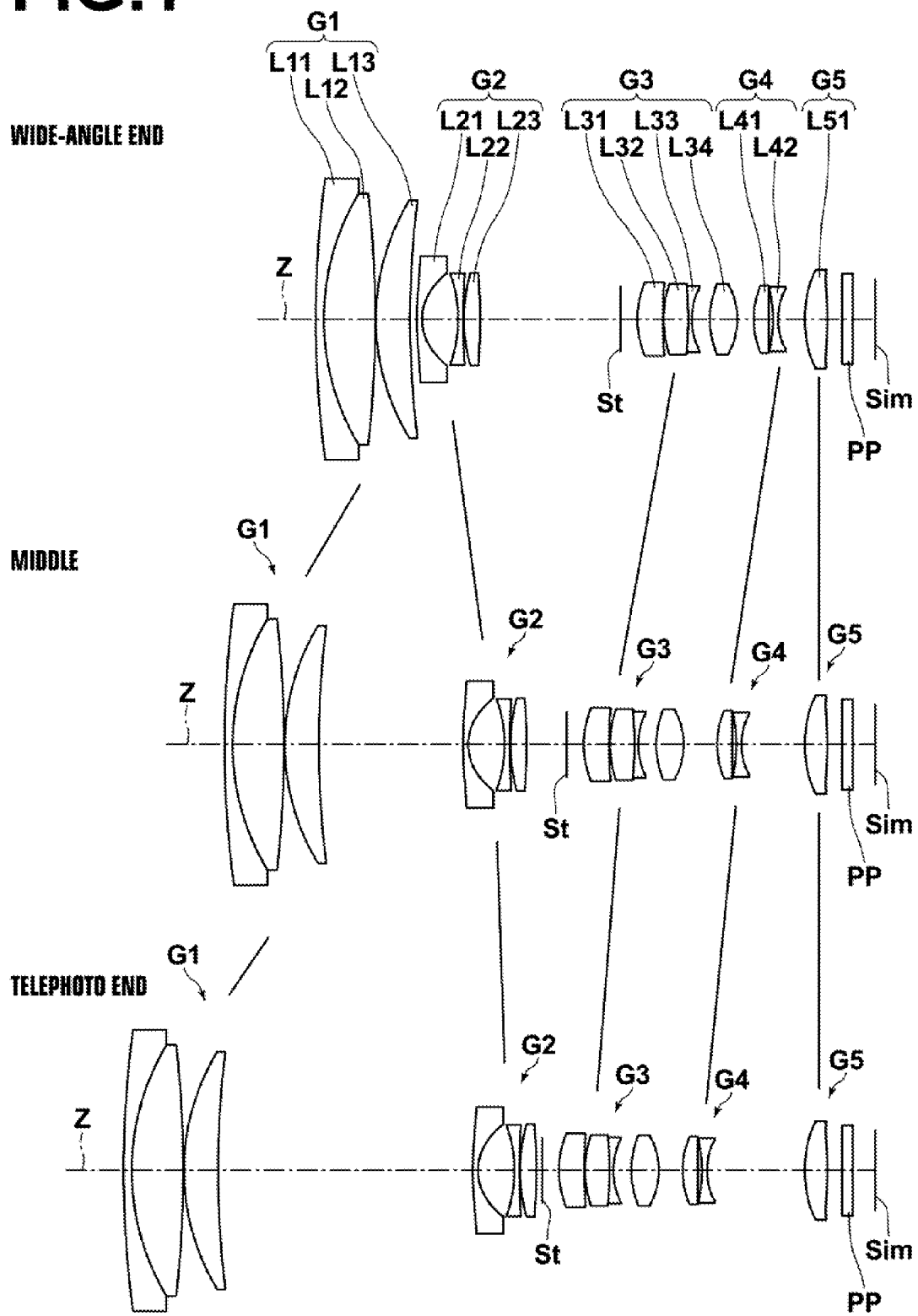

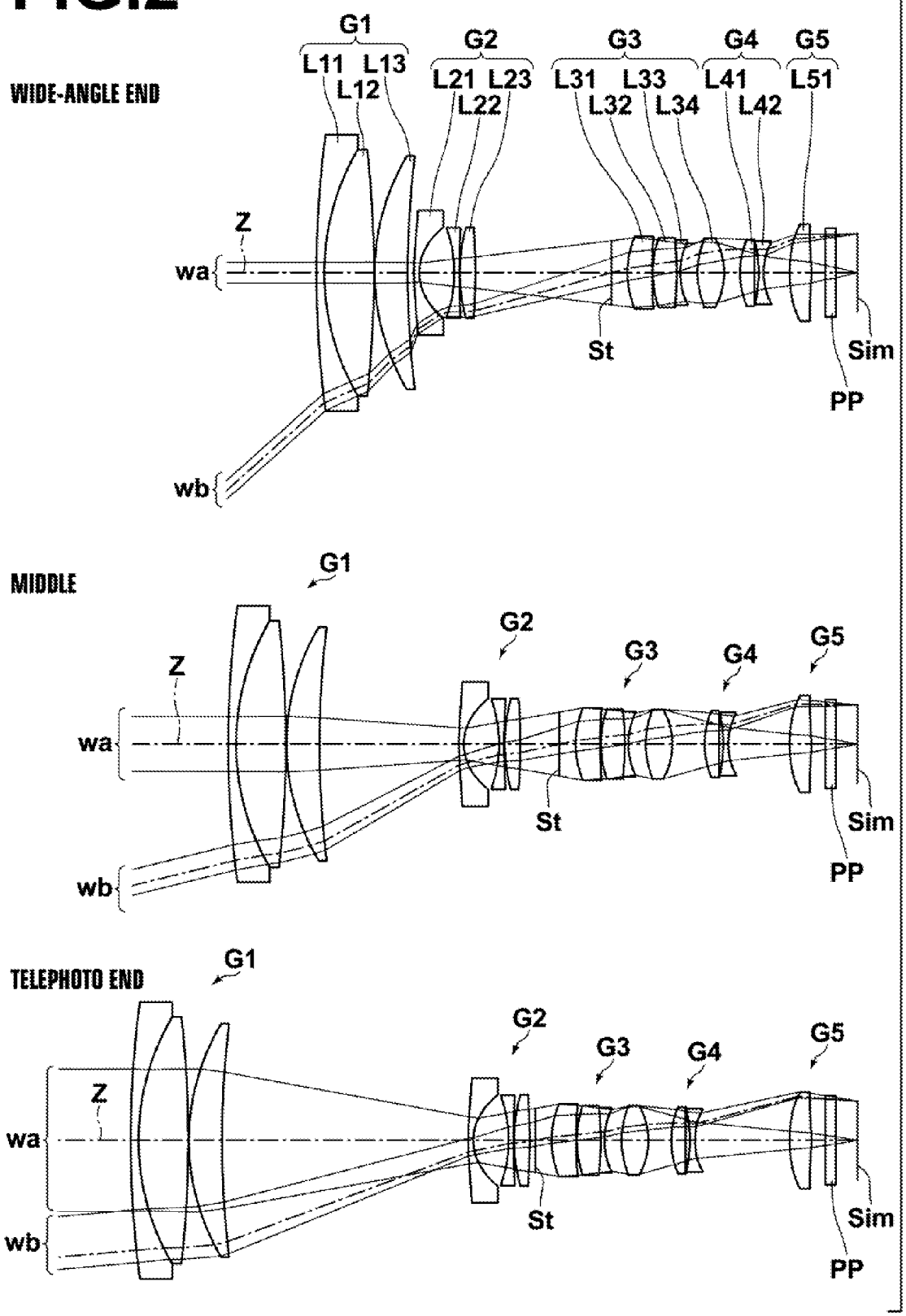

FIG.3 EXAMPLE 2
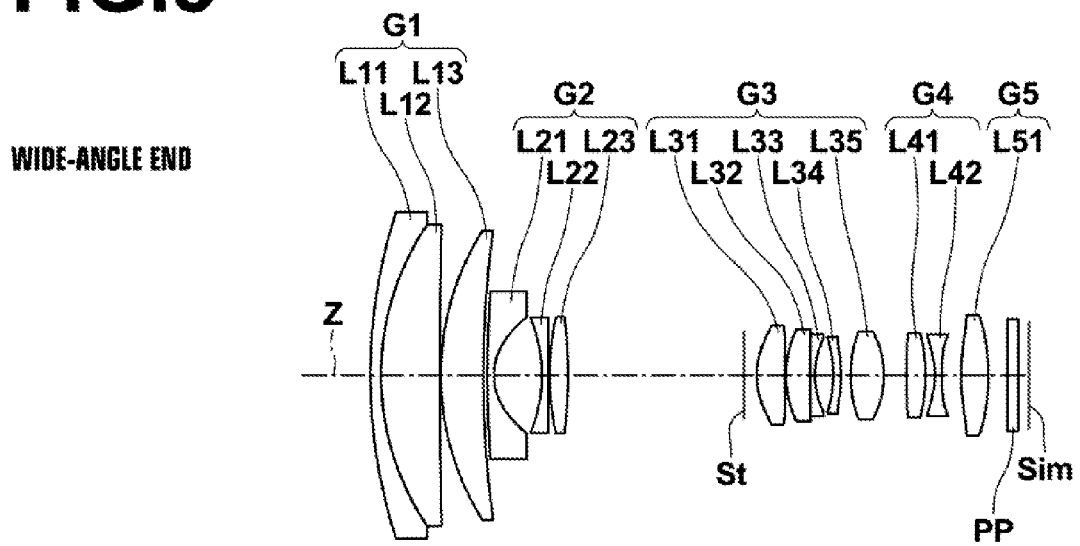
WIDE-ANGLE END
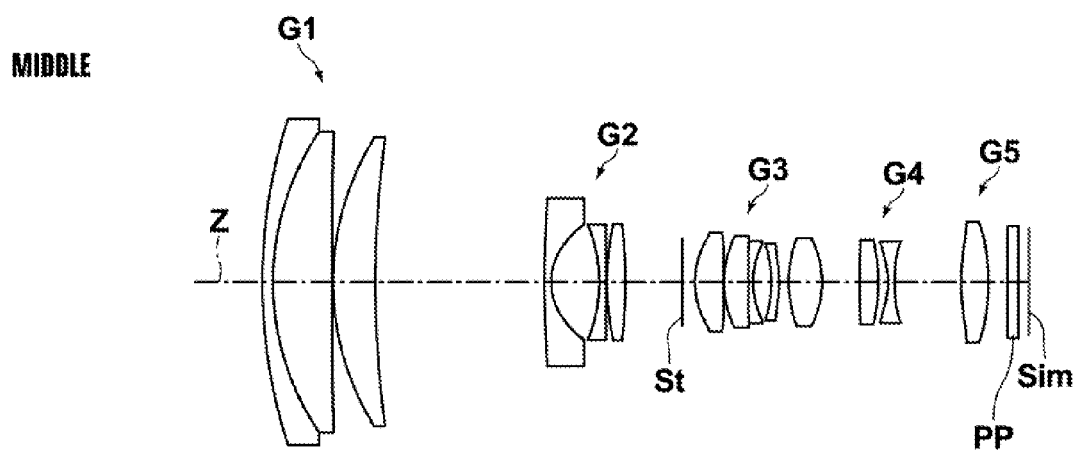
MIDDLE
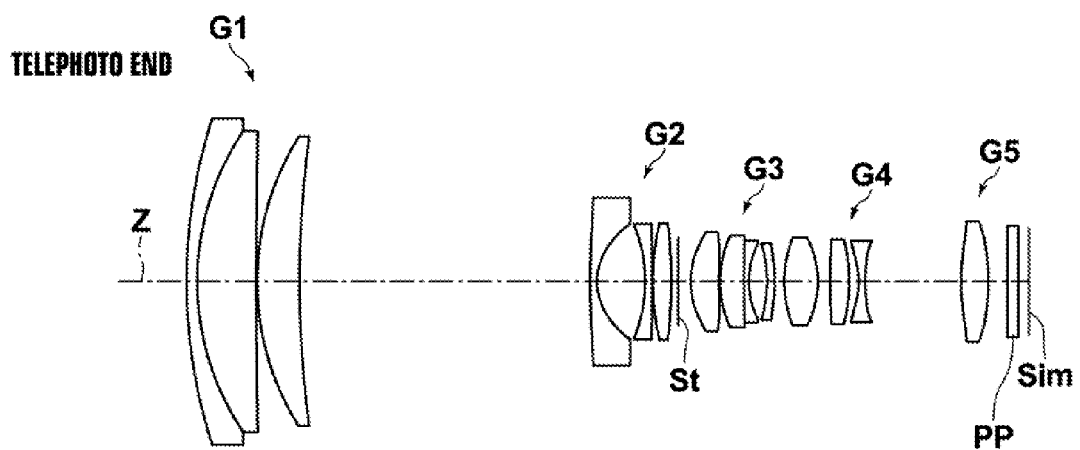
TELEPHOTO END

FIG.4
EXAMPLE 3
WIDE-ANGLE END
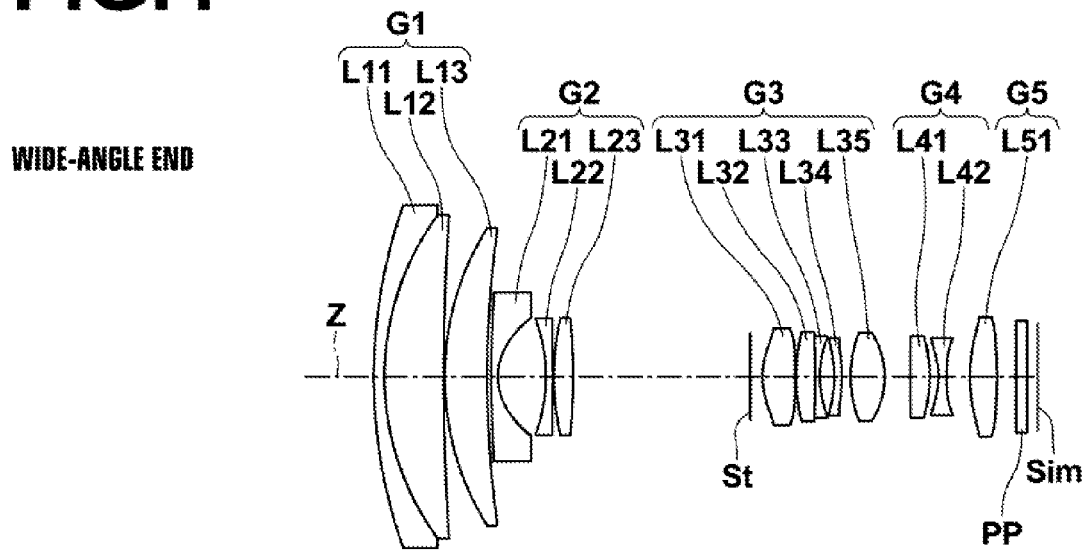
MIDDLE
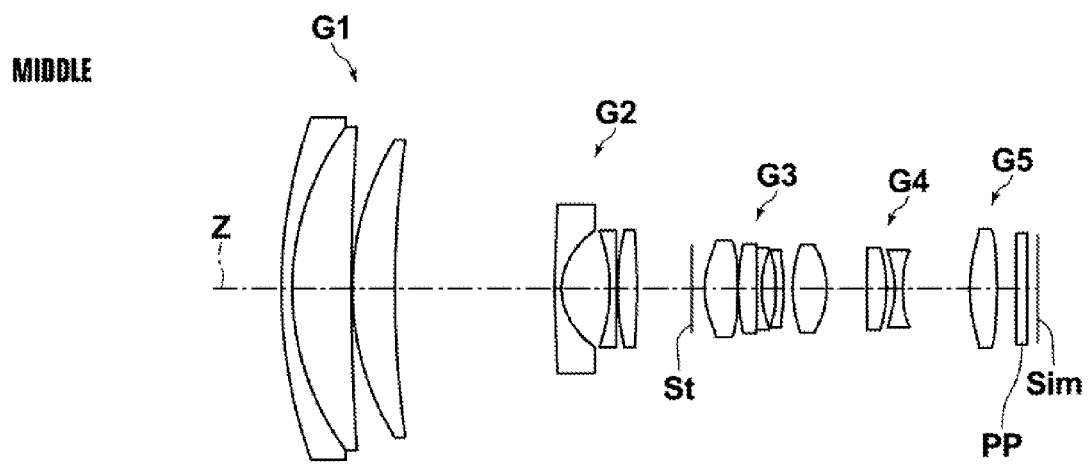
TELEPHOTO END
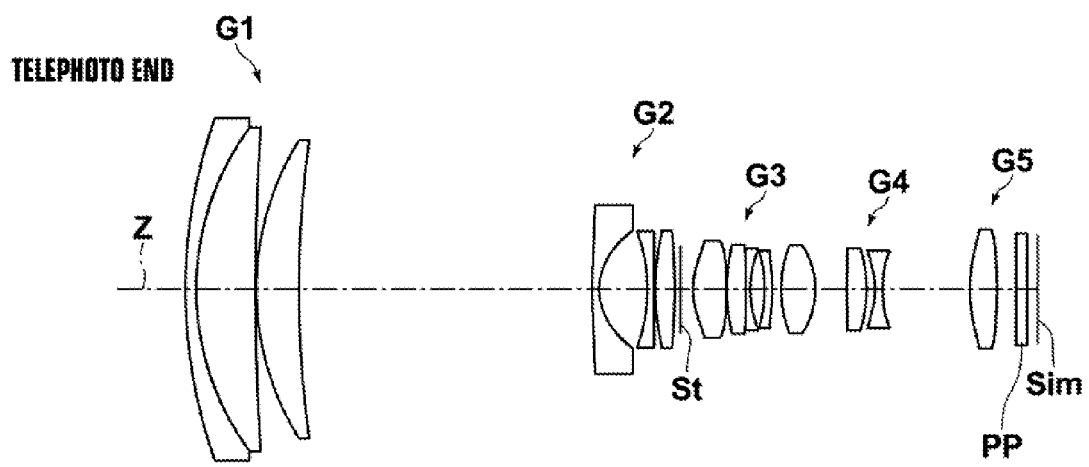

FIG.7
EXAMPLE 1
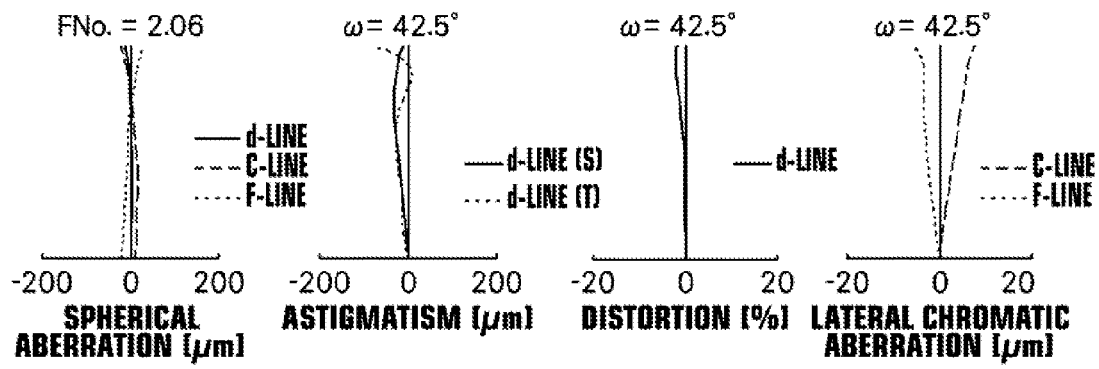
WIDE-ANGLE END
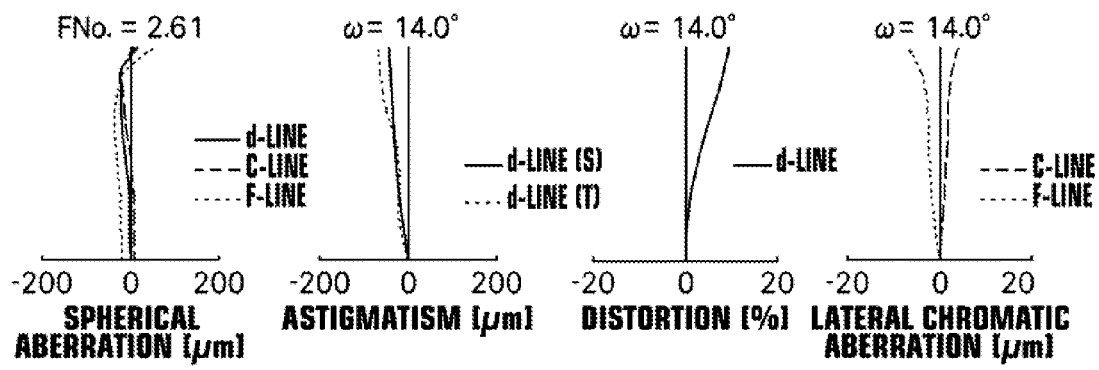
MIDDLE
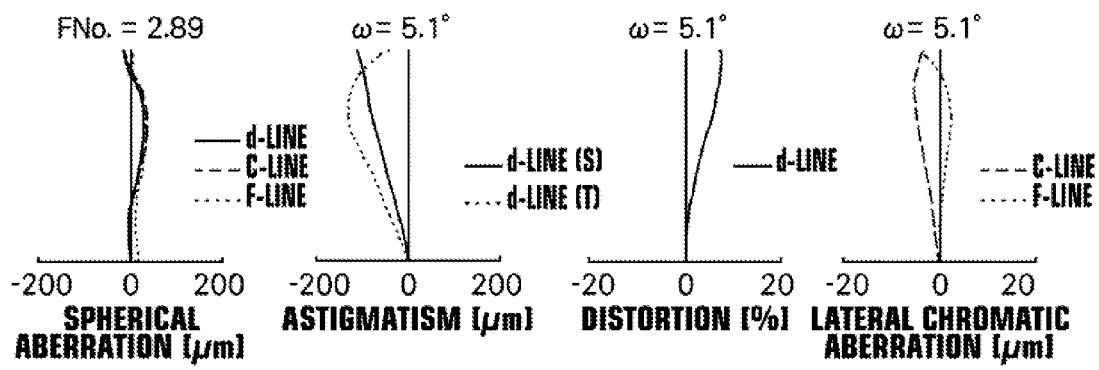
TELEPHOTO END

FIG.8
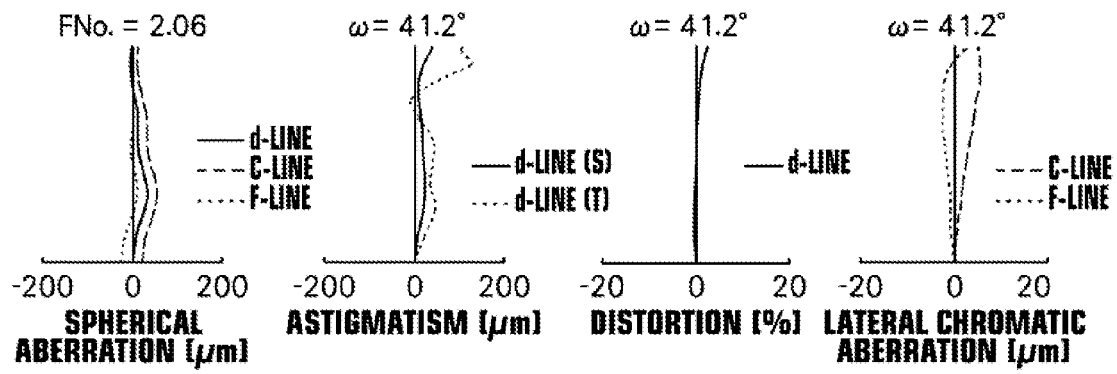
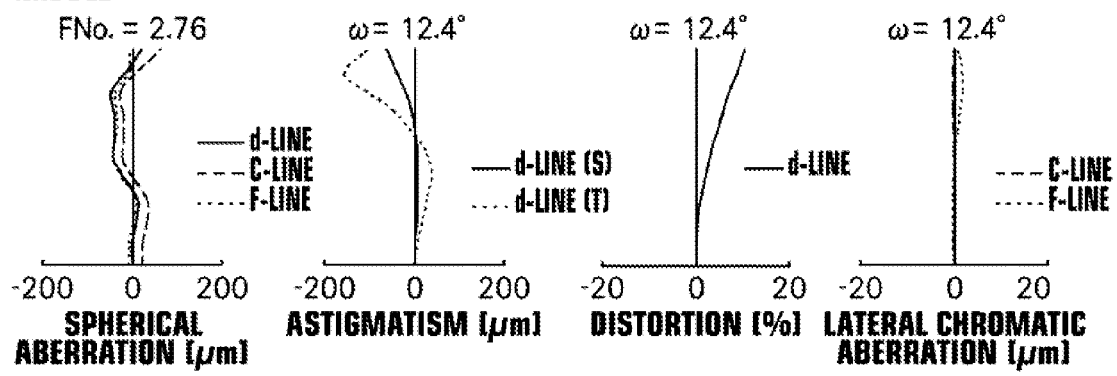
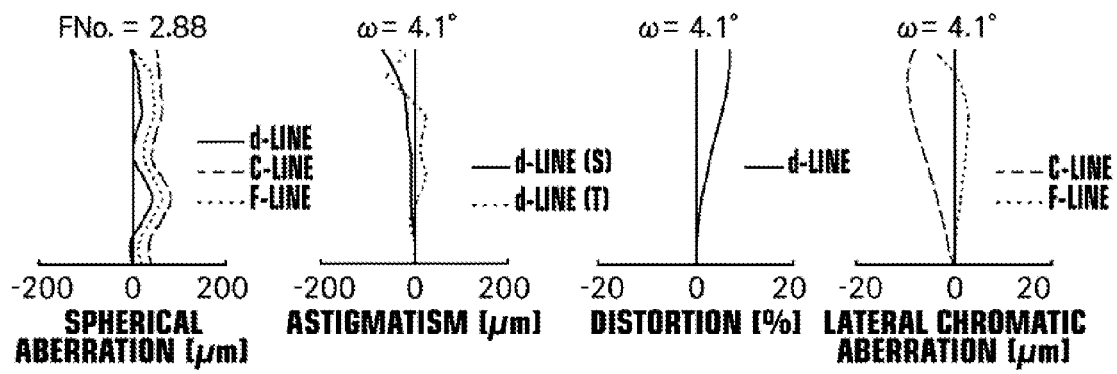

FIG.9
EXAMPLE 3
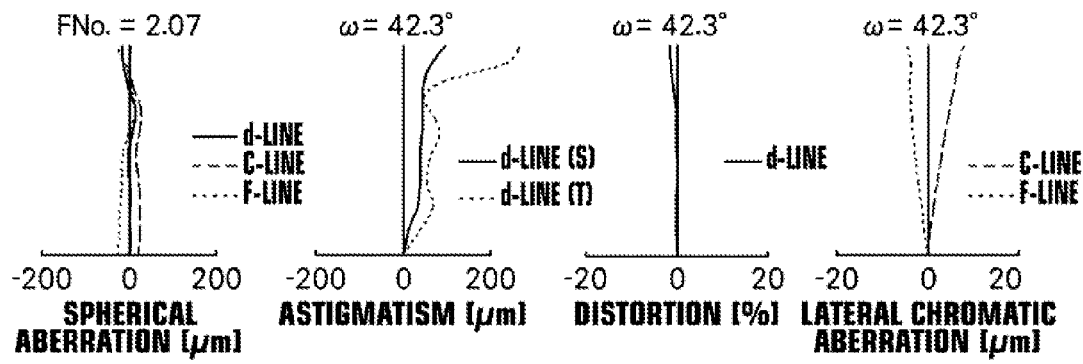
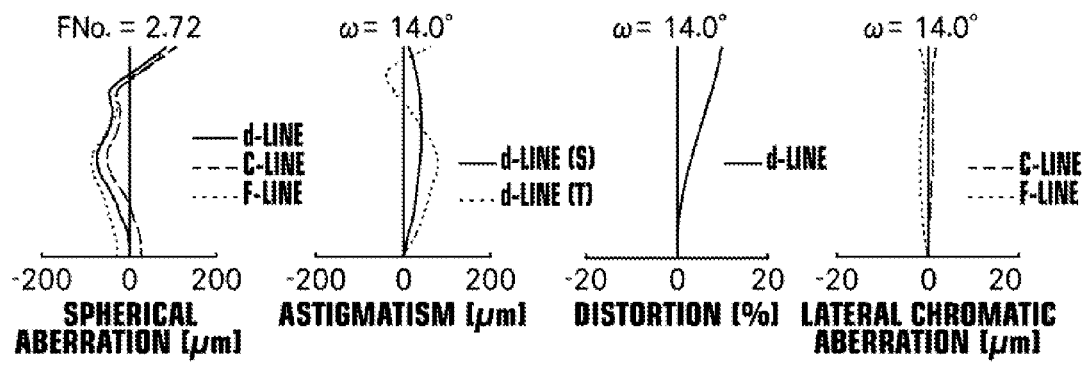
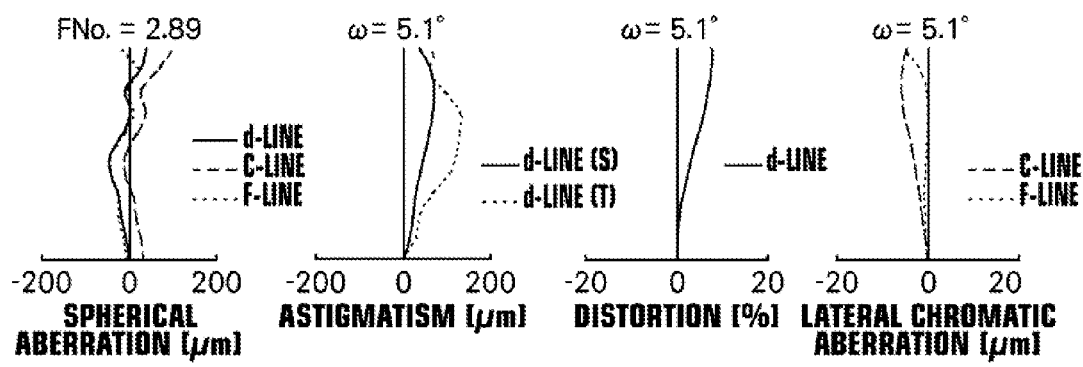

FIG.10
EXAMPLE 4
WIDE-ANGLE END
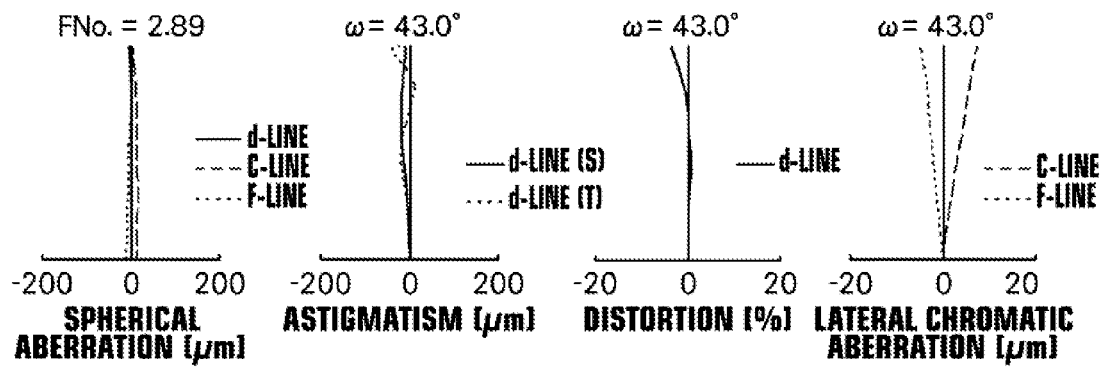
MIDDLE
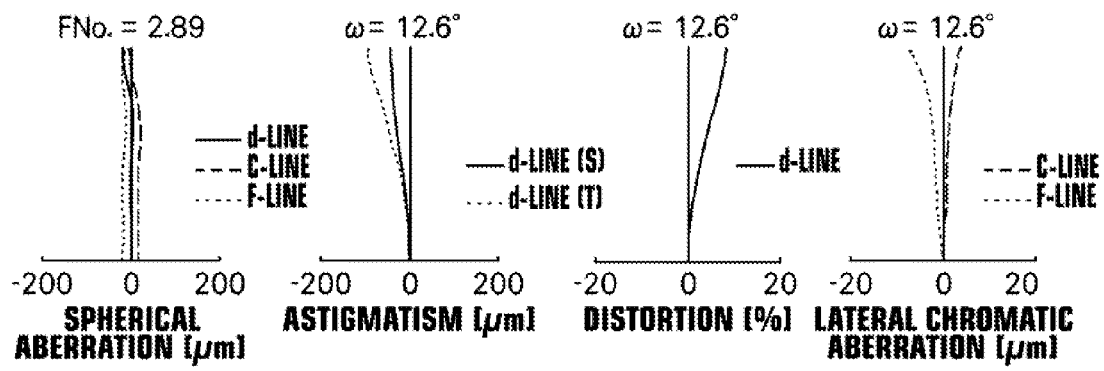
TELEPHOTO END
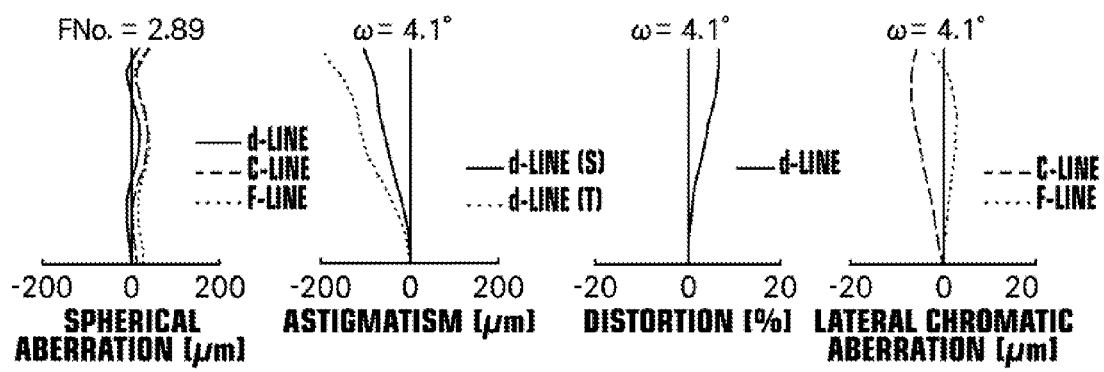

FIG.11
EXAMPLE 5
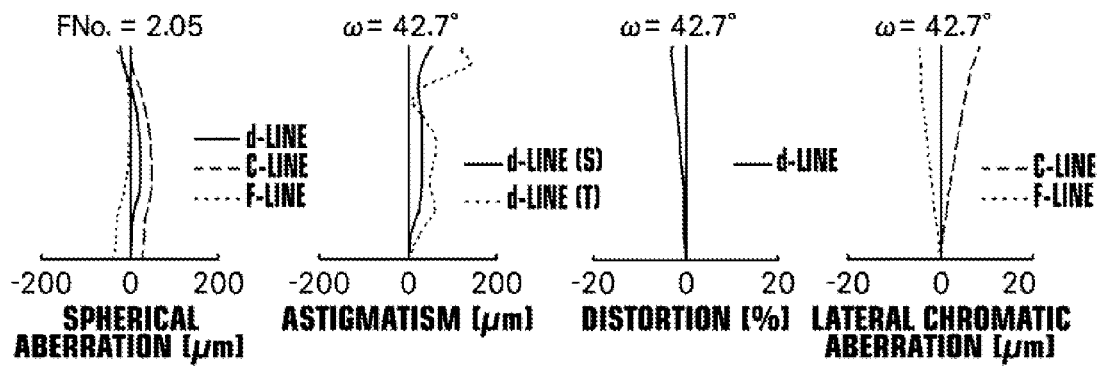
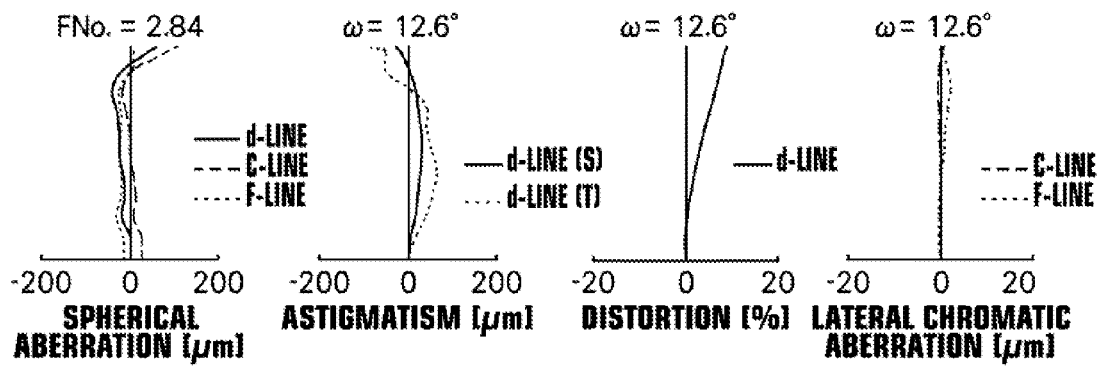
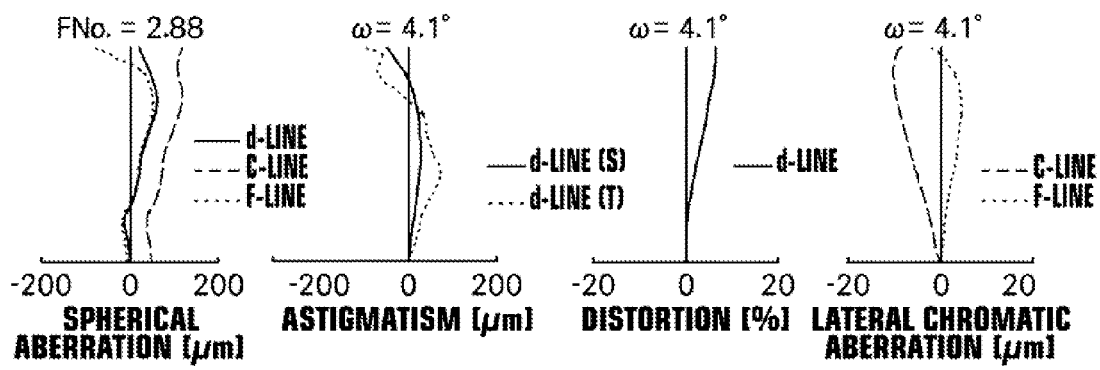

ZOOM LENS AND IMAGING APPARATUS

CROSS-REFERENCE TO RELATED APPLICATIONS

The present application claims priority under 35 U.S.C. §119 to Japanese Patent Application No. 2014-125253, filed on Jun. 18, 2014. The above application is hereby expressly incorporated by reference, in its entirety, into the present application.

BACKGROUND OF THE INVENTION

Field of the Invention

The present invention relates to a zoom lens, and particularly to a zoom lens that is suitable for uses with electronic cameras, such as digital cameras, video cameras, broadcasting cameras, monitoring cameras, etc.

The present invention also relates to an imaging apparatus provided with the zoom lens.

Description of the Related Art

Conventionally, as a zoom lens suitable for achieving high magnification, a five-group type zoom lens including, in order from the object side, a first lens group having a positive refractive power, a second lens group having a negative refractive power, a third lens group having a positive refractive power, a fourth lens group having a negative refractive power, and a fifth lens group having a positive refractive power is known.

This type of zoom lens is advantageous for correcting aberrations along with magnification change while keeping the entire length of the zoom lens relatively short. Japanese Unexamined Patent Publication No. 2014-029375 (hereinafter, Patent Document 1) discloses this type of zoom lens as Example 6, and Japanese Unexamined Patent Publication No. 2011-186454 (hereinafter, Patent Document 2) discloses this type of zoom lens as Examples 1 to 3.

SUMMARY OF THE INVENTION

In recent years, there are demands for so-called high-end digital compact cameras equipped with a zoom lens that has high magnification and wide angle of view, and small f-number (FNo.) at the telephoto end.

However, the zoom lens disclosed as Example 6 in Patent Document 1 has a total angle of view of 77.7°, and this angle of view is not wide enough. The zoom lenses disclosed as Examples 1 to 3 in Patent Document 2 have a total angle of view slightly above 76° and an f-number of 5.9 to 6.0 at the telephoto end. That is, the angle of view is not wide enough and the f-number at the telephoto end is large.

In view of the above-described circumstances, the present invention is directed to providing a zoom lens having good optical performance, namely, a zoom lens having high magnification, wide angle of view, and small f-number at the telephoto end, as well as an imaging apparatus provided with the zoom lens.

An aspect of the zoom lens of the invention consists essentially of, in order from the object side, a first lens group having a positive refractive power, a second lens group having a negative refractive power, a stop, a third lens group having a positive refractive power, a fourth lens group having a negative refractive power, and a fifth lens group having a positive refractive power, wherein, during magnification change from a wide-angle end to a telephoto end, at least the first to the fourth lens groups are moved independently from one another such that the distance between the first lens group and the second lens group always increases, the distance between the second lens group and the third lens group always decreases, and the distance between the third lens group and the fourth lens group and the distance between the fourth lens group and the fifth lens group are changed, the first lens group consists essentially of, in order from the object side, a meniscus lens having a negative refractive power with a concave surface toward an image side, a lens having a positive refractive power, and a lens having a positive refractive power, the third lens group includes at least four lenses including a lens A having a positive refractive power disposed at the most object-side position, a lens B having a positive refractive power disposed next to and on the image side of the lens A, a lens C having a negative refractive power with a concave surface toward the image side, the lens C being disposed next to and on the image side of the lens B, and a lens D having a positive refractive power and disposed at the most image-side position, and the condition expression (1) below is satisfied:

$$25 < vdD - vdA < 70 \qquad (1),$$

where vdA is an Abbe number with respect to the d-line of the lens A, and vdD is an Abbe number with respect to the d-line of the lens D.

It should be noted that the expression "consisting/consist essentially of" as used herein means that the zoom lens may include, besides the elements recited above: lenses substantially without any power; optical elements other than lenses, such as a stop, a mask, a cover glass, and filters; and mechanical components, such as a lens flange, a lens barrel, an image sensor, a camera shake correction mechanism, etc.

The sign (positive or negative) with respect to the surface shape and the refractive power of any lens including an aspheric surface are about the paraxial region.

It is desired that the zoom lens of the invention having the above-described configuration satisfy the condition expression (2) below:

$$35 < vdB - vdC < 70 \qquad (2),$$

where vdB is an Abbe number with respect to the d-line of the lens B, and vdC is an Abbe number with respect to the d-line of the lens C.

It is desired that the zoom lens of the invention satisfy the condition expression (3) below:

$$35 < vdB - vdA < 70 \qquad (3),$$

where vdA is an Abbe number with respect to the d-line of the lens A, and vdB is an Abbe number with respect to the d-line of the lens B.

It is desired that, in the zoom lens of the invention, the most object-side lens surface of the second lens group be convex toward the object side.

It is desired that, in the zoom lens of the invention, the fourth lens group function as a focusing lens group.

In the case where the fourth lens group functions as a focusing lens group in the zoom lens of the invention, it is desired that the condition expression (4) below be satisfied:

$$-9.0 < fT/f4 < -2.0 \qquad (4),$$

where fT is a focal length of the entire system at the telephoto end, and f4 is a focal length of the fourth lens group.

It should be noted that all the focal lengths mentioned herein, such as the focal length fT, the focal length f4, etc., are focal lengths with respect to the d-line.

It is desired that, in the zoom lens of the invention, the distance between the third lens group and the fourth lens group at the telephoto end be greater than the distance between the third lens group and the fourth lens group at the wide-angle end.

It is desired that, in the zoom lens of the invention, the distance between the fourth lens group and the fifth lens group at the telephoto end be greater than the distance between the fourth lens group and the fifth lens group at the wide-angle end.

It is desired that, in the zoom lens of the invention, the condition expression (5) below be satisfied:

$$-8 < f1/f2 < -4 \tag{5},$$

where f1 is a focal length of the first lens group, and f2 is a focal length of the second lens group.

It is desired that, in the zoom lens of the invention, the condition expression (6) below be satisfied:

$$2.5 < f1/f3 < 8 \tag{6},$$

where f1 is a focal length of the first lens group, and f3 is a focal length of the third lens group.

It is desired that, in the zoom lens of the invention, the condition expression (7) below be satisfied:

$$0.7 < f3/RCr < 2.5 \tag{7},$$

where f3 is a focal length of the third lens group, and RCr is a paraxial radius of curvature of the image-side surface of the lens C.

It is desired that, in the zoom lens of the invention, the condition expression (8) below be satisfied:

$$1.0 < (fD - vdD)/(fA - vdA) < 3.0 \tag{8},$$

where fA is a focal length of the lens A, fD is a focal length of the lens D, vdA is an Abbe number with respect to the d-line of the lens A, and vdD is an Abbe number with respect to the d-line of the lens D.

It is desired that, in the zoom lens of the invention, in particular the condition expression (1-1) below, within the numerical range defined by the condition expression (1) above, be satisfied:

$$27 < vdD - vdA < 60 \tag{1-1}.$$

It is desired that, in the zoom lens of the invention, in particular the condition expression (2-1) below, within the numerical range defined by the condition expression (2) above, be satisfied:

$$40 < vdB - vdC < 60 \tag{2-1}.$$

It is desired that, in the zoom lens of the invention, in particular the condition expression (3-1) below, within the numerical range defined by the condition expression (3) above, be satisfied:

$$37 < vdB - vdA < 60 \tag{3-1}.$$

It is desired that, in the zoom lens of the invention, in particular the condition expression (4-1) below, within numerical range defined by the condition expression (4) above, be satisfied:

$$-7.5 < fT/f4 < -3.0 \tag{4-1}.$$

It is desired that, in the zoom lens of the invention, in particular the condition expression (5-1) below, within the numerical range defined by the condition expression (5) above, be satisfied:

$$-7 < f1/f2 < -5 \tag{5-1}.$$

It is desired that, in the zoom lens of the invention, in particular the condition expression (6-1) below, within the numerical range defined by the condition expression (6) above, be satisfied:

$$3 < f1/f3 < 6 \tag{6-1}.$$

It is desired that, in the zoom lens of the invention, in particular the condition expression (7-1) below, within the numerical range defined by the condition expression (7) above, be satisfied:

$$0.8 < f3/RCr < 2 \tag{7-1}.$$

The imaging apparatus of the invention comprises the above-described zoom lens of the invention.

The zoom lens of the invention consists essentially of, in order from the object side, the first lens group having a positive refractive power, the second lens group having a negative refractive power, a stop, the third lens group having a positive refractive power, the fourth lens group having a negative refractive power, and the fifth lens group having a positive refractive power, wherein, during magnification change from the wide-angle end to the telephoto end, at least the first to the fourth lens groups are moved independently from one another such that the distance between the first lens group and the second lens group always increases, the distance between the second lens group and the third lens group always decreases, and the distance between the third lens group and the fourth lens group and the distance between the fourth lens group and the fifth lens group are changed, the first lens group consists essentially of, in order from the object side, a meniscus lens having a negative refractive power with a concave surface toward the image side, a lens having a positive refractive power, and a lens having a positive refractive power, the third lens group includes at least four lenses including a lens A having a positive refractive power disposed at the most object-side position, a lens B having a positive refractive power disposed next to and on the image side of the lens A, a lens C having a negative refractive power with a concave surface toward the image side, the lens C being disposed next to and on the image side of the lens B, and a lens D having a positive refractive power and disposed at the most image-side position, and the condition expression (1) below is satisfied:

$$25 < vdD - vdA < 70 \tag{1}.$$

This configuration allows providing a high magnification zoom lens having wide angle of view, and small f-number at the telephoto end.

The imaging apparatus of the invention, which is provided with the above-described zoom lens of the invention, allows obtaining high magnification and wide angle images, and bright high magnification images.

BRIEF DESCRIPTION OF THE DRAWINGS

FIG. 1 is a sectional view illustrating the lens configuration of a zoom lens according to one embodiment of the invention (a zoom lens of Example 1), FIG. 2 is a diagram showing optical paths through the zoom lens according to one embodiment of the invention (the zoom lens of Example 1), FIG. 3 is a sectional view illustrating the lens configuration of a zoom lens of Example 2 of the invention, FIG. 4 is a sectional view illustrating the lens configuration of a zoom lens of Example 3 of the invention, FIG. 7 shows aberration diagrams of the zoom lens of Example 1 of the invention, FIG. 8 shows aberration diagrams of the zoom lens of Example 2 of the invention, FIG. 9 shows aberration diagrams of the zoom lens of Example 3 of the invention, FIG. 10 shows aberration diagrams of the zoom lens of Example 4 of the invention, FIG. 11 shows aberration diagrams of the zoom lens of Example 5 of the invention.

DESCRIPTION OF THE PREFERRED EMBODIMENTS

Figure 5:
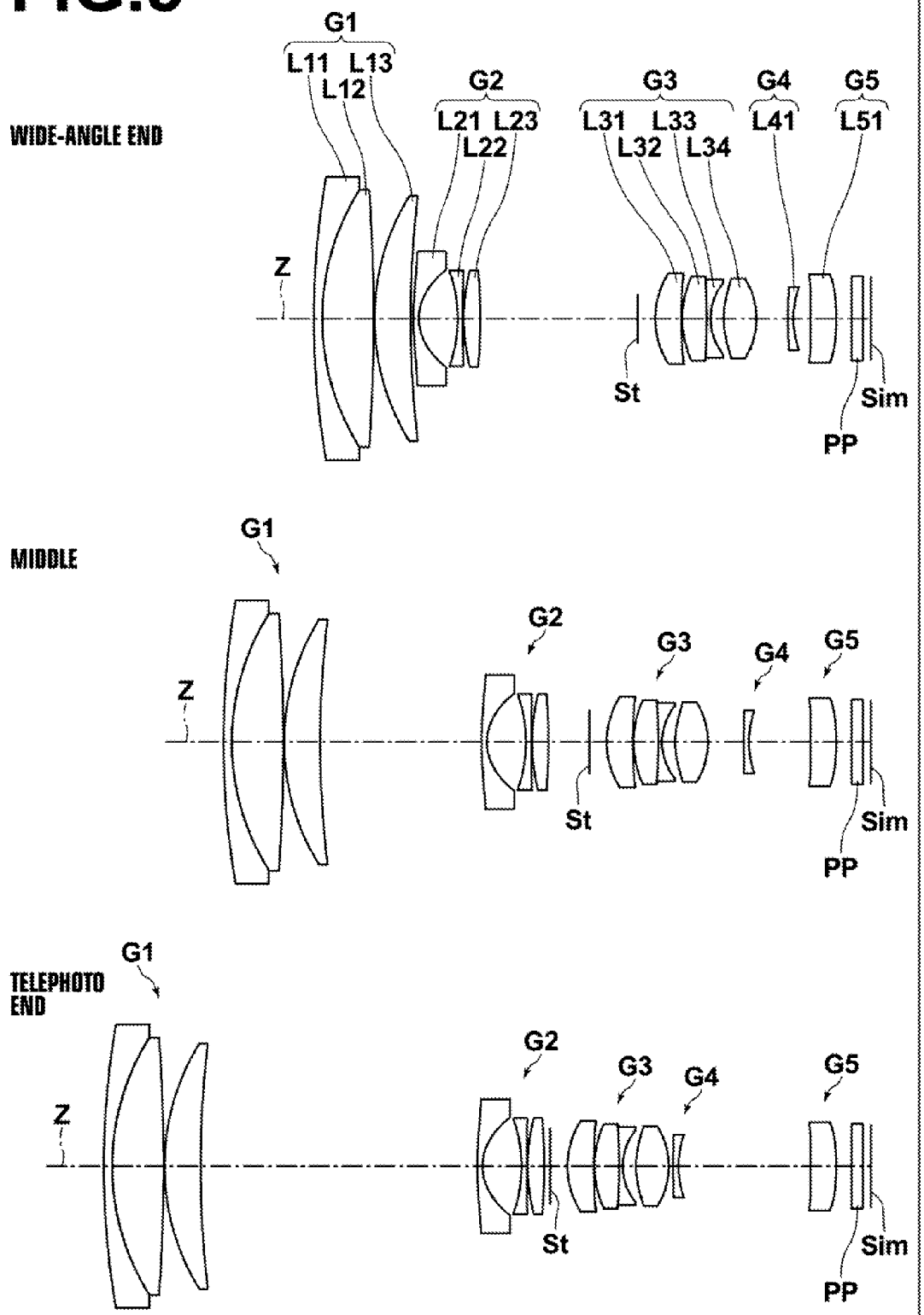
FIG. 5 is a sectional view illustrating the lens configuration of a zoom lens of Example 4 of the invention.

Hereinafter, embodiments of the present invention will be described in detail with reference to the drawings. FIG. 1 is a sectional view illustrating the lens configuration of a zoom lens according to one embodiment of the invention, and FIG. 2 is a diagram showing optical paths of an on-axis bundle of rays wa and a bundle of rays wb at the maximum angle of view traveling through the zoom lens. The configuration example shown in FIGS. 1 and 2 is the same as the configuration of a zoom lens of Example 1, which will be described later.

In FIGS. 1 and 2, the left side is the object side and the right side is the image side, and the arrangement of the optical system at the wide-angle end (in a shortest focal length state) is shown at the top, the arrangement of the optical system at the telephoto end (in a longest focal length state) is shown at the bottom, and the arrangement of the optical system at the middle position (in an intermediate focal length state) is shown at the middle. It should be noted that the lens is focused on infinity in all the above three states. The solid lines drawn between the arrangements of the optical system shown in FIG. 1 schematically represent movement loci of the first to fourth lens groups G1 to G4 between the three states. The fifth lens group G5 is fixed during magnification change.

FIGS. 3 to 6 are sectional views showing other configuration examples according to the embodiment of the invention, and correspond to zoom lenses of Examples 2 to 5, which will be described later. The examples shown in FIGS. 1 to 6 have the same basic configuration, except some differences which will be described later, and are shown in the same manner in the drawings. Now, the zoom lens according to the embodiment of the invention is described mainly with reference to FIG. 1.

As shown in FIGS. 1 and 2, this zoom lens includes, in order from the object side along the optical axis Z, a first lens group G1 having a positive refractive power, a second lens group G2 having a negative refractive power, an aperture stop St, a third lens group G3 having a positive refractive power, a fourth lens group G4 having a negative refractive power, and a fifth lens group G5 having a positive refractive power. It should be noted that the aperture stop St shown in the drawings does not necessarily represent the size and the shape thereof, but represents the position thereof along the optical axis Z.

When this zoom lens is used with an imaging apparatus, it is preferred to provide a cover glass, a prism, various filters, such as an infrared cutoff filter and a low-pass filter, etc., between the optical system and an image plane Sim depending on the configuration of the camera on which the lens is mounted. In the example shown in FIGS. 1 and 2, an optical member PP in the form of a plane-parallel plate, which is assumed to represent such elements, is disposed between the lens system and the image plane Sim.

The zoom lens of this embodiment is configured such that, during magnification change from the wide-angle end to the telephoto end, the first to the fourth lens groups G1 to G4 are moved such that the distance between the first lens group G1 and the second lens group G2 always increases, the distance between the second lens group G2 and the third lens group G3 always decreases, and the distance between the third lens group G3 and the fourth lens group G4 and the distance between the fourth lens group G4 and the fifth lens group G5 are changed.

This configuration allows the zoom lens of this embodiment to have high magnification, and facilitates correction of aberrations along with magnification change while keeping the entire length of the zoom lens relatively short. In particular, in the zoom lens of this embodiment, the first lens group G1 is moved during magnification change. Since the first to the third lens groups G1 to G3 have positive, negative, and positive powers, respectively, high magnification can be achieved while keeping the refractive power of the first lens group G1 relatively small. This allows successfully correcting spherical aberration and chromatic aberration without largely moving the first lens group G1 at the telephoto end, and minimizing the ray height at the first lens group G1 at the wide-angle end to thereby facilitate reducing the diameter of the first lens group G1.

In the zoom lens of this embodiment, the aperture stop St is disposed between the second lens group G2 and the third lens group G3. This facilitates reducing the f-number of the zoom lens, and also facilitates reducing the diameter of the zoom lens. In other words, if the aperture stop St is disposed nearer to the object side than the position between the second lens group G2 and the third lens group G3, the aperture stop St will have a large aperture diameter, resulting in a large diameter of the third lens group G3. In this case, each lens surface of the third lens group G3 cannot be provided with a sufficient curvature. This makes correction of spherical aberration difficult, and makes reduction of the f-number of the zoom lens difficult. On the other hand, if the aperture stop St is disposed nearer to the image side than the position between the second lens group G2 and the third lens group G3, the most object-side lens needs to have a large diameter to achieve wide angle of view.

The first lens group G1 includes, in order from the object side, a first-group first lens L11 having a negative refractive power and having a meniscus shape with the concave surface toward the image side, a first-group second lens L12 having a positive refractive power, and a first-group third lens L13 having a positive refractive power. The first-group first lens L11 and the first-group second lens L12 are cemented together. It should be noted that, hereinafter, "having a negative refractive power" is simply expressed as "negative", and "having a positive refractive power" is simply expressed as "positive".

Disposing the two positive lenses, i.e., the first-group second lens L12 and the first-group third lens L13, as described above, allows increasing the refractive power of the positive lenses as a whole while suppressing spherical aberration at the telephoto end. The combination of the negative first-group first lens L11 with the first-group second lens L12 and the first-group third lens L13 allows properly correcting longitudinal chromatic aberration. It should be noted that, if the first lens group G1 is formed by four or more lenses, the thickness in the optical axis direction and the effective diameter of the lens group become large, although this is advantageous in view of aberration correction. Forming the first-group first lens L11 at the most object-side position of the first lens group G1 by the negative meniscus lens with the concave surface toward the image side allows preventing overcorrection of lateral chromatic aberration at the peripheral area of the lens at the wide-angle side.

The second lens group G2 includes, in order from the object side, a negative second-group first lens L21, a negative second-group second lens L22, and a positive second-group third lens L23. The object-side lens surface of the second-group first lens L21 is convex toward the object side.

Providing the most object-side lens surface of the second lens group G2 with a convex shape toward the object side, as described above, is advantageous for suppressing astigmatism and distortion, and achieving wide angle of view.

The third lens group G3 includes, in order from the object side, a positive third-group first lens L31, a positive third-group second lens L32, a negative third-group third lens L33 with a concave surface toward the image side, and a positive third-group fourth lens L34. The third-group second lens L32 and the third-group third lens L33 are cemented together. The third-group first lens L31, the third-group second lens L32, and the third-group third lens L33 form a lens A, a lens B, and a lens C, respectively, of the invention, and the third-group fourth lens L34 at the most image-side position forms a lens D of the invention.

It should be noted that any other lens may be disposed between the lens C and the lens D. In Examples 2, 3, and 5, which will be described later, one such lens is disposed and the third lens group G3 is formed by five lenses. In Example 4, which will be described later, no such lens is disposed and the third lens group G3 is formed by four lenses, as with Example 1.

Disposing the two positive lenses, i.e., the third-group first lens L31 and the third-group second lens L32, consecutively as described above is advantageous for suppressing spherical aberration and reducing the f-number of the zoom lens.

Further, disposing the negative third-group third lens L33 next to and on the image side of the two positive lenses allows correcting longitudinal chromatic aberration, lateral chromatic aberration, and spherical aberration. In particular, the negative third-group third lens L33 having a concave surface toward the image side is advantageous for reducing variation of spherical aberration for different wavelengths while correcting longitudinal chromatic aberration, and reducing the f-number of the zoom lens.

Further, disposing the positive third-group fourth lens L34 at the most image-side position is advantageous for providing the third lens group G3 with a sufficient refractive power, and reducing the f-number of the zoom lens.

The zoom lens of this embodiment satisfies the condition expression (1) below:

$$25 < vdD - vdA < 70 \quad (1),$$

where vdA is an Abbe number with respect to the d-line of the lens A (the third-group first lens L31), and vdD is an Abbe number with respect to the d-line of the lens D (the third-group fourth lens L34).

As described previously, in Example 1, the lens A is the third-group first lens L31, and the lens D is the third-group fourth lens L34. As shown in Table 1, which will be described later, the third-group first lens L31 has an Abbe number vdA=31.08, and the third-group fourth lens L34 has an Abbe number vdD=81.56. Hence, vdD−vdA=50.48 in Example 1, and thus the condition expression (1) is satisfied. It should be noted that Table 16 shows values for conditions corresponding to the numerical ranges defined by the condition expression (1) and condition expressions (2) to (8), i.e., values corresponding to the literal expressions in the condition expressions.

When the condition expression (1) is satisfied, lateral chromatic aberration which tends to occur at the wide-angle end can successfully be corrected, and longitudinal chromatic aberration can properly be corrected. Now, this point is described in detail.

The lower limit of the value of vdD−vdA defined in the condition expression (1) is based on an idea that the Abbe number vdA of the lens A disposed at the most object-side position of the third lens group is set to be sufficiently smaller than the Abbe number vdD of the lens D disposed at the most image-side position of the third lens group (that is, the dispersion of the lens A is set to be sufficiently greater than the dispersion of the lens D).

In other words, when the zoom lens of the type consisting essentially of the first to the fifth lens groups G1 to G5, as described above, is configured as a high magnification and wide angle zoom lens, undercorrection of lateral chromatic aberration tends to occur at the wide-angle end. If the lateral chromatic aberration is corrected mainly with the negative lens C of the third lens group G3, then overcorrection of longitudinal chromatic aberration tends to occur. To address this problem, a lens made of a material having a relatively large dispersion is used as the positive lens A disposed next to the aperture stop, so that correction of longitudinal chromatic aberration tends to be undercorrection, to thereby prevent overcorrection of the longitudinal chromatic aberration even when the negative lens C on the image side of the positive lens A has a large refractive power to sufficiently correct the lateral chromatic aberration. Further, the relatively large dispersion of the positive lens A allows using a lens having a relatively small dispersion as the positive lens D at the most image-side position. This prevents correction of the lateral chromatic aberration from becoming difficult due to a large dispersion of the positive lens D.

Based on this, when the dispersion of the lens A is set to be greater than the dispersion of the lens D such that the value of vdD−vdA is greater than 25, the lateral chromatic aberration which tends to occur at the wide-angle end can successfully be corrected, and the longitudinal chromatic aberration can properly be corrected.

On the other hand, setting the value of vdD−vdA smaller than 70 prevents undercorrection of the longitudinal chromatic aberration to allow successful correction of the longitudinal chromatic aberration.

The above-described effect can be more effectively obtained when in particular the condition expression (1-1) below, within the range defined by the condition expression (1), is satisfied:

$$27 < vdD - vdA < 60 \quad (1-1).$$

The zoom lens of this embodiment satisfies the condition expression (2) below:

$$35 < vdB - vdC < 70 \quad (2),$$

where vdB is an Abbe number with respect to the d-line of the lens B (the third-group second lens L32), and vdC is an Abbe number with respect to the d-line of the lens C (the third-group third lens L33). Specifically, vdB−vdC=54.03 in Example 1 (see Table 16). It should be noted that, in this embodiment, the lens B is the third-group second lens L32, and the lens C is the third-group third lens L33.

When the zoom lens of this embodiment satisfies the condition expression (2), longitudinal chromatic aberration, and lateral chromatic aberration at the wide-angle end can properly be corrected. Namely, when the value of vdB−vdC is greater than 35, undercorrection of the longitudinal chromatic aberration, and the lateral chromatic aberration at the wide-angle end are prevented to allow successful correction of the longitudinal chromatic aberration, and the lateral chromatic aberration at the wide-angle. On the other hand, when the value of vdB−vdC is smaller than 70, overcorrection of the longitudinal chromatic aberration is prevented to allow proper correction of the longitudinal chromatic aberration.

The above-described effect can be more effectively obtained when in particular the condition expression (2-1) below, within the range defined by the condition expression (2), is satisfied:

$$40<vdB-vdC<60 \tag{2-1}.$$

The zoom lens of this embodiment satisfies the condition expression (3) below:

$$35<vdB-vdA<70 \tag{3},$$

where vdA is an Abbe number with respect to the d-line of the lens A (the third-group first lens L31), and vdB is an Abbe number with respect to the d-line of the lens B (the third-group second lens L32). Specifically, vdB−vdA=50.46 in Example 1 (see Table 16). It should be noted that, in this embodiment, the lens A is the third-group first lens L31, and the lens B is the third-group second lens L32.

When the zoom lens of this embodiment satisfies the condition expression (3), longitudinal chromatic aberration, and lateral chromatic aberration at the wide-angle end can properly be corrected. Namely, when the value of vdB−vdA is greater than 35, undercorrection of the lateral chromatic aberration at the wide-angle end, which is due to that the magnification to light of a shorter wavelength is smaller, and overcorrection of the longitudinal chromatic aberration are prevented to allow proper correction of the lateral chromatic aberration at the wide-angle end and the longitudinal chromatic aberration. On the other hand, when the value of vdB−vdA is smaller than 70, undercorrection of the longitudinal chromatic aberration is prevented to allow successful correction of the longitudinal chromatic aberration.

The above-described effect can be more effectively obtained when in particular the condition expression (3-1) below, within the range defined by the condition expression (3), is satisfied:

$$37<vdB-vdA<60 \tag{3-1}.$$

The fourth lens group G4 includes, in order from the object side, a positive fourth-group first lens L41, and a negative fourth-group second lens L42. The fourth lens group G4 functions as a focusing lens group that is moved along the optical axis Z during focusing.

With the configuration where the fourth lens group G4 functions as the focusing lens group, the focusing lens can have a small diameter and thus can have a light weight, and this is advantageous for speeding up the focusing operation.

The zoom lens of this embodiment has the fourth lens group G4 functioning as the focusing lens group, as described above, and satisfies the condition expression (4) below:

$$-9.0<fT/f4<-2.0 \tag{4},$$

where fT is a focal length of the entire system at the telephoto end, and f4 is a focal length of the fourth lens group G4. Specifically, fT/f4=−4.299 in Example 1 (see Table 16).

When the zoom lens of this embodiment satisfies the condition expression (4), changes of aberrations along with focusing can be kept small, and the amount of movement of the lens during focusing can be reduced. Namely, when the value of fT/f4 is greater than −9.0, increase of changes of aberrations along with focusing is prevented. On the other hand, when the value of fT/f4 is smaller than −2.0, increase of the amount of movement of the lens during focusing is prevented.

The above-described effect can be more effectively obtained when in particular the condition expression (4-1) below, within the range defined by the condition expression (4), is satisfied:

$$-7.5<fT/f4<-3.0 \tag{4-1}.$$

The fifth lens group G5 consists only of a positive fifth-group first lens L51. The fifth lens group G5 is fixed during magnification change.

During magnification change, the third lens group G3 and the fourth lens group G4 are moved such that the distance between the third lens group G3 and the fourth lens group G4 at the telephoto end is greater than the distance between the third lens group G3 and the fourth lens group G4 at the wide-angle end. This configuration prevents large changes of positions of marginal rays passing through the fourth lens group G4 depending on the focused state, thereby reducing changes of aberrations during magnification change. In particular, when the fourth lens group G4 functions as the focusing lens group, as described above, this configuration allows reducing changes of aberrations along with focusing across the entire zoom range.

In the zoom lens of this embodiment, the fourth lens group G4 is moved during magnification change such that the distance between the fourth lens group G4 and the fixed fifth lens group G5 at the telephoto end is greater than the distance between the fourth lens group G4 and the fixed fifth lens group G5 at the wide-angle end. This configuration allows reducing the amount of movement of the first lens group G1 and is advantageous for reducing the entire length of the zoom lens.

The zoom lens of this embodiment satisfies the condition expression (5) below:

$$-8<f1/f2<-4 \tag{5},$$

where f1 is a focal length of the first lens group G1, and f2 is a focal length of the second lens group G2. Specifically, f1/f2=−5.979 in Example 1 (see Table 16).

When the zoom lens of this embodiment satisfies the condition expression (5), the entire length can be kept short, and large zoom ratio can be ensured. Namely, when the value of f1/f2 is greater than −8, increase of the entire length of the zoom lens is prevented. On the other hand, when the value of f1/f2 is smaller than −4, it is easy to ensure large zoom ratio.

The above-described effect can be more effectively obtained when in particular the condition expression (5-1) below, within the range defined by the condition expression (5), is satisfied:

$$-7<f1/f2<-5 \tag{5-1}.$$

The zoom lens of this embodiment satisfies the condition expression (6) below:

$$2.5<f1/f3<8 \tag{6},$$

where f1 is a focal length of the first lens group G1, and f3 is a focal length of the third lens group G3. Specifically, f1/f3=4.062 in Example 1 (see Table 16).

When the zoom lens of this embodiment satisfies the condition expression (6), the entire length can be kept short, and large zoom ratio can be ensured. Namely, when the value of f1/f3 is greater than 2.5, it is easy to ensure large zoom ratio. On the other hand, when the value of f1/f3 is smaller than 8, increase of the entire length of the zoom lens is prevented.

The above-described effect can be more effectively obtained when in particular the condition expression (6-1) below, within the range defined by the condition expression (6), is satisfied:

$$3<f1/f3<6 \quad (6\text{-}1).$$

The zoom lens of this embodiment satisfies the condition expression (7) below:

$$0.7<f3/RCr<2.5 \quad (7),$$

where f3 is a focal length of the third lens group G3, and RCr is a paraxial radius of curvature of the image-side surface of the lens C (the third-group third lens L33). Specifically, f3/RCr=1.348 in Example 1 (see Table 16).

When the zoom lens of this embodiment satisfies the condition expression (7), longitudinal chromatic aberration and lateral chromatic aberration can successfully be corrected, and high-order spherical aberration can be suppressed. Namely, when the value of f3/RCr is greater than 0.7, undercorrection of longitudinal chromatic aberration and lateral chromatic aberration is prevented to allow successful correction of the longitudinal chromatic aberration and the lateral chromatic aberration. On the other hand, when the value of f3/RCr is smaller than 2.5, higher-order spherical aberration is suppressed.

The above-described effect can be more effectively obtained when in particular the condition expression (7-1) below, within the range defined by the condition expression (7), is satisfied:

$$0.8<f3/RCr<2 \quad (7\text{-}1).$$

The zoom lens of this embodiment satisfies the condition expression (8) below:

$$1.0<(fD\times vdD)/(fA\times vdA)<3.0 \quad (8),$$

where fA is a focal length of the lens A (the third-group first lens L31), fD is a focal length of the lens D (the third-group fourth lens L34), vdA is an Abbe number with respect to the d-line of the lens A (the third-group first lens L31), and vdD is an Abbe number with respect to the d-line of the lens D (the third-group fourth lens L34). Specifically, (fD×vdD)/(fA×vdA)=1.338 in Example 1 (see Table 16).

When the zoom lens of this embodiment satisfies the condition expression (8), lateral chromatic aberration at the wide-angle end can successfully be corrected, and longitudinal chromatic aberration can properly be corrected. Namely, when the value of (fD×vdD)/(fA×vdA) is greater than 1.0, undercorrection of lateral chromatic aberration at the wide-angle end is prevented to allow successful correction of the lateral chromatic aberration at the wide-angle end. On the other hand, when the value of (fD×vdD)/(fA×vdA) is smaller than 3.0, overcorrection of longitudinal chromatic aberration is prevented to allow proper correction of the longitudinal chromatic aberration.

In the example shown in FIG. 1, the optical member PP is disposed between the lens system and the image plane Sim. However, in place of disposing the various filters, such as a low-pass filter and a filter that cuts off a specific wavelength range, between the lens system and the image plane Sim, the various filters may be disposed between the lenses, or coatings having the same functions as the various filters may be applied to the lens surfaces of some of the lenses.

Next, numerical examples of the zoom lens of the invention are described.

First, a zoom lens of Example 1 is described. FIG. 1 shows the lens configuration of the zoom lens of Example 1. As described previously, the third lens group G3 of the zoom lens of Example 1 is formed by four lenses.

Table 1 shows basic lens data of the zoom lens of Example 1, Table 2 shows data about specifications of the zoom lens (including distances between surfaces to be moved), and Table 3 shows data about aspheric coefficients of the zoom lens. In the following description, meanings of symbols used in the tables are explained with respect to Example 1 as an example. The same explanations basically apply to those with respect to Examples 2 to 5.

In the lens data shown in Table 1, each value in the column of "Si" represents the i-th (where i=1, 2, 3, . . . ) surface number, where the object-side surface of the most object-side element is the 1st surface and the number is sequentially increased toward the image side, each value in the column of "Ri" represents the radius of curvature of the i-th surface, and each value in the column of "Di" represents the distance along the optical axis Z between the i-th surface and the i+1-th surface. Each value in the column of "Ndj" represents the refractive index with respect to the d-line (the wavelength of 587.6 nm) of the j-th optical element (where j=1, 2, 3, . . . ), where the most object-side optical element is the 1st element and number is sequentially increased toward the image side, and each value in the column of "vdj" represents the Abbe number with respect to the d-line (the wavelength of 587.6 nm) of the j-th optical element.

The sign with respect to the radius of curvature is provided such that a positive radius of curvature indicates a surface shape that is convex toward the object side, and a negative radius of curvature indicates a surface shape that is convex toward the image side. The basic lens data also includes data of the aperture stop St and the optical member PP, and the text "(aperture stop)" is shown at the position in the column of the surface number corresponding to the aperture stop St. In the lens data shown in Table 1, the value of each surface distance that is changed during magnification change is represented by the symbol "DD[i]". The value shown at the bottom of the column of "Di" is the distance between the image-side surface of the optical member PP and the image plane Sim.

The data about specifications shown in Table 2 show the values of zoom magnification, focal length f', back focus Bf', f-number FNo., and total angle of view 2ω at the wide-angle end, at the middle position, and at the telephoto end, respectively. Further, Table 2 shows the value of each surface distance DD[i] shown in Table 1.

With respect to the basic lens data and the data about specifications, the unit of angle is degrees (°), and the unit of length is millimeters; however, any other suitable units may be used since optical systems are usable when they are proportionally enlarged or reduced.

In the lens data shown in Table 1, the symbol "*" is added to the surface number of each aspheric surface, and a numerical value of the paraxial radius of curvature is shown as the radius of curvature of each aspheric surface. In the data about aspheric coefficients shown in Table 3, the surface number Si of each aspheric surface and aspheric coefficients about each aspheric surface are shown. The aspheric coefficients are values of the coefficients KA and Am (where m=3, 4, 5, . . . , 15) in the formula of aspheric surface (B) shown below:

$$Zd=C\cdot h^2/\{1+(1-KA\cdot C^2\cdot h^2)^{1/2}\}+\Sigma Am\cdot h^m \quad (B),$$

where Zd is a depth of the aspheric surface (a length of a perpendicular line from a point with a height h on the aspheric surface to a plane tangent to the apex of the aspheric surface and perpendicular to the optical axis), h is the height (a distance from the optical axis), C is a reciprocal of the paraxial radius of curvature, and KA and Am are aspheric coefficients (where m=3, 4, 5, . . . , 15).

TABLE 1

Example 1 - Lens Data

| Si (Surface No.) | Ri (Radius of Curvature) | Di (Surface Distance) | Ndj (Refractive Index) | νdj (Abbe Number) |
|---|---|---|---|---|
| 1 | 156.2192 | 1.1100 | 1.91082 | 35.25 |
| 2 | 35.7119 | 7.0608 | 1.59282 | 68.63 |
| 3 | −165.4260 | 0.1000 | | |
| 4 | 33.4820 | 4.6925 | 1.72916 | 54.68 |
| 5 | 141.4516 | DD[5] | | |
| *6 | 47.0526 | 0.7000 | 1.85135 | 40.10 |
| *7 | 7.0608 | 5.0157 | | |
| 8 | −19.4913 | 0.7000 | 1.88100 | 40.14 |
| 9 | 102.1156 | 0.1000 | | |
| 10 | 25.4647 | 2.1998 | 1.95906 | 17.47 |
| 11 | −93.3475 | DD[11] | | |
| 12 (aperture stop) | ∞ | 2.3000 | | |
| *13 | 13.3730 | 3.5002 | 1.68893 | 31.08 |
| *14 | 80.5753 | 0.1000 | | |
| 15 | 15.5791 | 3.3877 | 1.49700 | 81.54 |
| 16 | −47.9471 | 0.5000 | 1.75520 | 27.51 |
| 17 | 10.3264 | 2.4631 | | |
| *18 | 11.9036 | 3.7940 | 1.49710 | 81.56 |
| *19 | −10.0297 | DD[19] | | |
| 20 | 12.6049 | 2.0524 | 1.59282 | 68.63 |
| 21 | ∞ | 0.6030 | | |
| *22 | −17.0873 | 0.7000 | 1.82080 | 42.71 |
| *23 | 9.8542 | DD[23] | | |
| *24 | 21.0362 | 3.0830 | 1.80139 | 45.45 |
| *25 | −32.9609 | 2.0000 | | |
| 26 | ∞ | 1.5000 | 1.51680 | 64.20 |
| 27 | ∞ | 3.0593 | | |

TABLE 2

Example 1 - Specifications (d-line)

| | Wide Angle End | Middle | Telephoto End |
|---|---|---|---|
| Zoom Magnification | 1.0 | 3.3 | 9.4 |
| f | 6.29 | 20.63 | 59.29 |
| Bf | 6.05 | 6.05 | 6.05 |
| FNo. | 2.06 | 2.61 | 2.89 |
| 2ω[°] | 85.0 | 28.0 | 10.2 |

TABLE 2-continued

Example 1 - Specifications (d-line)

| | Wide Angle End | Middle | Telephoto End |
|---|---|---|---|
| DD[5] | 0.9202 | 19.8264 | 35.0194 |
| DD[11] | 19.3091 | 5.5612 | 0.8090 |
| DD[19] | 2.2364 | 4.5859 | 3.2552 |
| DD[23] | 3.6868 | 8.7070 | 13.4490 |

TABLE 3

Example 1 - Aspheric Coefficients

| Surface No. | 6 | 7 | 13 | 14 |
|---|---|---|---|---|
| KA | 1.0000000E+00 | −1.5612011E+00 | 1.0000000E+00 | 1.0000000E+00 |
| A3 | 0.0000000E+00 | 0.0000000E+00 | 0.0000000E+00 | 0.0000000E+00 |
| A4 | −7.1536679E−05 | 6.5636953E−04 | −7.0470241E−05 | −1.2992795E−05 |
| A5 | 3.2057065E−06 | 7.8733704E−05 | 1.1113949E−05 | 9.1086179E−06 |
| A6 | −1.5915324E−06 | −4.1131982E−05 | −1.7265597E−06 | −3.1065189E−07 |
| A7 | 3.0418662E−07 | 5.6926986E−06 | −1.0021079E−07 | −1.3680178E−07 |
| A8 | −1.3103328E−08 | 5.6881422E−08 | 8.1562915E−08 | 1.8228321E−08 |
| A9 | −7.2519790E−10 | −7.2373507E−08 | −2.7109847E−09 | 1.6715620E−08 |
| A10 | −3.7200289E−11 | −2.1833682E−09 | −2.8577722E−09 | 7.8862551E−10 |
| A11 | 1.5230898E−11 | 1.6915061E−09 | 4.7191081E−10 | −1.2511819E−09 |
| A12 | −7.1113191E−13 | −1.1232172E−10 | −2.0512169E−11 | 1.3192130E−10 |

| Surface No. | 18 | 19 | 22 | 23 |
|---|---|---|---|---|
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | −2.4278465E−04 | 1.0258320E−04 | 2.4470381E−05 | −4.3774990E−04 |
| A5 | 3.1971382E−06 | −3.6999141E−06 | 7.8740583E−05 | 1.9419403E−04 |
| A6 | −8.0122532E−07 | 1.2083498E−06 | 1.9959312E−05 | −2.8219284E−05 |
| A7 | 1.1550670E−08 | −4.4919955E−07 | −5.2335598E−06 | 4.2244037E−06 |
| A8 | −2.3458253E−09 | −4.3895741E−09 | −7.0848226E−07 | 5.5513183E−07 |
| A9 | −2.9371788E−10 | 1.1900643E−08 | 2.3497712E−07 | −4.0987831E−07 |
| A10 | 1.2446729E−10 | −1.1030483E−09 | −1.3912186E−08 | 4.6216760E−08 |

TABLE 3-continued

| | Example 1 - Aspheric Coefficients | |
|---|---|---|
| Surface No. | 24 | 25 |
| KA | 1.0000000E+00 | 1.0000000E+00 |
| A3 | 0.0000000E+00 | 0.0000000E+00 |
| A4 | 1.7303708E−04 | 3.7356700E−04 |
| A5 | −5.7340774E−05 | −3.8471581E−05 |
| A6 | 1.5163269E−05 | 4.6382788E−06 |
| A7 | −1.3266879E−06 | −5.0180252E−07 |
| A8 | −3.0736725E−08 | 2.2549505E−07 |
| A9 | 1.4120648E−08 | −4.5189851E−08 |
| A10 | −8.9346079E−10 | 2.4401311E−09 |

FIG. 7 shows aberration diagrams of the zoom lens of Example 1. The aberration diagrams shown at the top of FIG. 7 are those of spherical aberration, astigmatism, distortion, and lateral chromatic aberration at the wide-angle end in this order from the left side, the aberration diagrams shown at the middle of FIG. 7 are those of spherical aberration, astigmatism, distortion, and lateral chromatic aberration at the middle position in this order from the left side, and the aberration diagrams shown at the bottom of FIG. 7 are those of spherical aberration, astigmatism, distortion, and lateral chromatic aberration at the telephoto end in this order from the left side. The aberration diagrams of spherical aberration, astigmatism, and distortion show those with respect to the d-line (the wavelength of 587.6 nm), which is used as a reference wavelength. The aberration diagrams of spherical aberration show those with respect to the d-line (the wavelength of 587.6 nm), the C-line (the wavelength of 656.3 nm), and the F-line (the wavelength of 486.1 nm) in the solid line, the dashed line, and the dotted line, respectively. The aberration diagrams of astigmatism show those in the sagittal direction and the tangential direction in the solid line and the dotted line, respectively. The aberration diagrams of lateral chromatic aberration show those with respect to the C-line (the wavelength of 656.3 nm) and the F-line (the wavelength of 486.1 nm) in the dashed line and the dotted line, respectively. The "FNo." in the aberration diagrams of spherical aberration means "f-number", and the "ω" in the other aberration diagrams means "half angle of view".

Next, a zoom lens of Example 2 is described. FIG. 3 shows the lens configuration of the zoom lens of Example 2. The third lens group G3 of the zoom lens of Example 2 includes, in order from the object side, a positive third-group first lens L31, a positive third-group second lens L32, a negative third-group third lens L33 with a concave surface toward the image side, a negative third-group fourth lens L34, and a positive third-group fifth lens L35.

In this configuration, the lens A, the lens B, the lens C, and the lens D of the invention are the third-group first lens L31, the third-group second lens L32, the third-group third lens L33, and the third-group fifth lens L35, respectively.

The above-described basic configuration of the third lens group G3 also applies to Examples 3 and 5, which will be described later.

Table 4 shows basic lens data of the zoom lens of Example 2, Table 5 shows data about specifications of the zoom lens, and Table 6 shows data about aspheric coefficients of the zoom lens. FIG. 8 shows aberration diagrams of the zoom lens of Example 2.

TABLE 4

| | Example 2 - Lens Data | | | |
|---|---|---|---|---|
| Si (Surface No.) | Ri (Radius of Curvature) | Di (Surface Distance) | Ndj (Refractive Index) | νdj (Abbe Number) |
| 1 | 58.9621 | 1.1100 | 2.00100 | 29.13 |
| 2 | 29.6934 | 6.1001 | 1.59282 | 68.63 |
| 3 | 779.6333 | 0.1000 | | |
| 4 | 30.0913 | 4.3998 | 1.74100 | 52.64 |
| 5 | 119.0425 | DD[5] | | |
| *6 | 72.5392 | 0.7000 | 1.85135 | 40.10 |
| *7 | 6.3937 | 4.9998 | | |
| 8 | −16.6666 | 0.7000 | 1.88100 | 40.14 |
| 9 | −621.1338 | 0.0998 | | |
| 10 | 29.8504 | 1.8966 | 1.95906 | 17.47 |
| 11 | −55.4054 | DD[11] | | |
| 12 (aperture stop) | ∞ | 1.3000 | | |
| *13 | 8.9285 | 2.9292 | 1.68893 | 31.08 |
| *14 | 249.9810 | 0.1000 | | |
| 15 | 11.6708 | 2.5098 | 1.48749 | 70.23 |
| 16 | 187.3073 | 0.5000 | 2.00272 | 19.32 |
| 17 | 9.4414 | 1.8786 | | |
| *18 | −15.3138 | 0.8000 | 1.82115 | 24.06 |
| *19 | −17.4382 | 1.0002 | | |
| 20 | 13.6936 | 3.4641 | 1.49700 | 81.54 |
| 21 | −10.4064 | DD[21] | | |
| 22 | 95.9935 | 1.9498 | 1.58144 | 40.75 |
| 23 | −19.2151 | 1.0002 | | |
| *24 | −6.9978 | 0.6998 | 1.82080 | 42.71 |
| *25 | 74.9710 | DD[25] | | |

TABLE 4-continued

Example 2 - Lens Data

| Si (Surface No.) | Ri (Radius of Curvature) | Di (Surface Distance) | Ndj (Refractive Index) | νdj (Abbe Number) |
|---|---|---|---|---|
| *26 | 19.7664 | 2.7998 | 1.80139 | 45.45 |
| *27 | −30.1135 | 2.0000 | | |
| 28 | ∞ | 1.1000 | 1.51680 | 64.20 |
| 29 | ∞ | 1.1107 | | |

TABLE 5

Example 2 - Specifications (d-line)

| | Wide Angle End | Middle | Telephoto End |
|---|---|---|---|
| Zoom Magnification | 1.0 | 3.7 | 11.8 |
| f | 6.29 | 23.22 | 74.13 |
| Bf | 3.84 | 3.84 | 3.84 |
| FNo. | 2.06 | 2.76 | 2.88 |
| 2ω[°] | 82.4 | 24.8 | 8.2 |

TABLE 5-continued

Example 2 - Specifications (d-line)

| | Wide Angle End | Middle | Telephoto End |
|---|---|---|---|
| DD[5] | 0.3998 | 17.5310 | 30.1471 |
| DD[11] | 18.2610 | 5.9058 | 0.7100 |
| DD[21] | 2.3540 | 3.8907 | 1.2852 |
| DD[25] | 2.0000 | 6.8693 | 9.9129 |

TABLE 6

Example 2 - Aspheric Coefficients

| Surface No. | 6 | 7 | 13 | 14 |
|---|---|---|---|---|
| KA | 1.0000000E+00 | 7.8781203E−01 | 1.0000000E+00 | 1.0000000E+00 |
| A3 | 0.0000000E+00 | 0.0000000E+00 | 0.0000000E+00 | 0.0000000E+00 |
| A4 | −9.5963046E−04 | −1.2704633E−03 | 4.1859323E−05 | −2.3875859E−05 |
| A5 | 9.3842820E−04 | 1.4199683E−04 | −1.7141904E−04 | 3.1903866E−05 |
| A6 | −4.5761876E−04 | −9.1502674E−04 | 7.5865318E−05 | −7.1004195E−05 |
| A7 | 1.2494060E−04 | 3.4818417E−04 | −4.3244795E−06 | 2.8101099E−05 |
| A8 | −1.7274940E−05 | −7.3830388E−05 | −7.0371442E−06 | 6.9337385E−07 |
| A9 | 1.5450801E−07 | 4.4025334E−06 | 1.9541726E−06 | −2.1975961E−06 |
| A10 | 3.2572269E−07 | 1.7571927E−06 | 3.5669750E−08 | 1.9627782E−07 |
| A11 | −4.3541574E−08 | −4.3919896E−07 | −8.1306877E−08 | 5.8455691E−08 |
| A12 | 8.1089188E−10 | 2.4603511E−08 | 6.7369865E−09 | −7.6171510E−09 |
| A13 | 2.8858364E−10 | 4.2425946E−09 | 1.0481569E−09 | −5.9530142E−10 |
| A14 | −2.6267433E−11 | −7.0605222E−10 | −1.3651217E−10 | 8.7727849E−11 |
| A15 | 7.2378995E−13 | 3.0738363E−11 | | |

| Surface No. | 18 | 19 | 24 | 25 |
|---|---|---|---|---|
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | −4.1095145E−03 | −2.9204586E−03 | 4.5900528E−03 | 2.3779647E−03 |
| A5 | 7.8027347E−03 | 5.9894173E−03 | −8.6530443E−04 | 2.4174030E−03 |
| A6 | −8.2493090E−03 | −5.8466148E−03 | 8.2581089E−04 | −2.9231537E−03 |
| A7 | 4.7923155E−03 | 2.9874930E−03 | −1.2957467E−03 | 1.2891356E−03 |
| A8 | −1.5052544E−03 | −6.9747068E−04 | 8.7504971E−04 | −1.6174392E−04 |
| A9 | 1.8348527E−04 | −1.9489495E−05 | −2.9519767E−04 | −8.3147730E−05 |
| A10 | 3.5730674E−05 | 5.2136968E−05 | 4.3500065E−05 | 3.7006612E−05 |
| A11 | −1.7259717E−05 | −1.0951995E−05 | 2.3944200E−06 | −3.5013009E−06 |
| A12 | 2.4591303E−06 | 7.4029304E−08 | −1.9666220E−06 | −9.5792247E−07 |
| A13 | −4.5666897E−08 | 3.2050825E−07 | 2.9203065E−07 | 2.5856047E−07 |
| A14 | −2.4514926E−08 | −5.1698046E−08 | −1.5439157E−08 | −1.8046389E−08 |
| A15 | 2.0123073E−09 | 2.7569046E−09 | | |

| Surface No. | 26 | 27 |
|---|---|---|
| KA | 1.0000000E+00 | 1.0000000E+00 |
| A3 | 0.0000000E+00 | 0.0000000E+00 |
| A4 | −8.4327569E−03 | −1.0998849E−02 |
| A5 | 1.1467181E−02 | 1.6191275E−02 |
| A6 | −7.2330590E−03 | −1.0886633E−02 |
| A7 | 2.3794166E−03 | 4.0290217E−03 |
| A8 | −3.3806091E−04 | −7.9224585E−04 |
| A9 | −2.5326055E−05 | 4.3695392E−05 |
| A10 | 1.6697512E−05 | 1.4363850E−05 |
| A11 | −2.0330643E−06 | −3.1224590E−06 |
| A12 | −4.3838678E−08 | 1.4907071E−07 |
| A13 | 3.2972973E−08 | 2.2089049E−08 |

TABLE 6-continued

| Example 2 - Aspheric Coefficients | | |
|---|---|---|
| A14 | −2.9874913E−09 | −3.1301430E−09 |
| A15 | 9.0701265E−11 | 1.1722377E−10 |

Next, a zoom lens of Example 3 is described. FIG. 4 shows the lens configuration of the zoom lens of Example 3.

Table 7 shows basic lens data of the zoom lens of Example 3, Table 8 shows data about specifications of the zoom lens, and Table 9 shows data about aspheric coefficients of the zoom lens. FIG. 9 shows aberration diagrams of the zoom lens of Example 3.

TABLE 7

| Example 3 - Lens Data | | | | |
|---|---|---|---|---|
| Si (Surface No.) | Ri (Radius of Curvature) | Di (Surface Distance) | Ndj (Refractive Index) | νdj (Abbe Number) |
| 1 | 56.5764 | 1.1100 | 2.00100 | 29.13 |
| 2 | 29.8477 | 6.0998 | 1.59282 | 68.63 |
| 3 | 265.6706 | 0.1000 | | |
| 4 | 31.0261 | 4.3998 | 1.74100 | 52.64 |
| 5 | 119.0518 | DD[5] | | |
| *6 | 67.5406 | 0.7000 | 1.85135 | 40.10 |
| *7 | 6.4253 | 5.0000 | | |
| 8 | −18.0321 | 0.7000 | 1.88100 | 40.14 |
| 9 | −805.2441 | 0.0998 | | |
| 10 | 27.9092 | 1.9998 | 1.95906 | 17.47 |
| 11 | −72.8860 | DD[11] | | |
| 12 (aperture stop) | ∞ | 1.3000 | | |
| *13 | 9.3398 | 3.3674 | 1.68893 | 31.08 |
| *14 | −178.2638 | 0.1000 | | |
| 15 | 21.3301 | 1.9345 | 1.48749 | 70.23 |
| 16 | −150.8359 | 0.5000 | 2.00272 | 19.32 |
| 17 | 11.9134 | 1.4567 | | |
| *18 | −25.1753 | 0.7998 | 1.82115 | 24.06 |
| *19 | −25.9402 | 0.9408 | | |
| 20 | 14.0849 | 3.4998 | 1.49700 | 81.54 |
| 21 | −8.9680 | DD[21] | | |
| 22 | 227.1045 | 2.0245 | 1.58144 | 40.75 |
| 23 | −15.9739 | 0.9158 | | |
| *24 | −6.9273 | 0.8002 | 1.82080 | 42.71 |
| *25 | 30.1395 | DD[25] | | |
| *26 | 16.3724 | 2.7998 | 1.80139 | 45.45 |
| *27 | −44.1077 | 2.0000 | | |
| 28 | ∞ | 1.1000 | 1.51680 | 64.20 |
| 29 | ∞ | 1.1030 | | |

TABLE 8

| Example 3 - Specifications (d-line) | | | |
|---|---|---|---|
| | Wide Angle End | Middle | Telephoto End |
| Zoom Magnification | 1.0 | 3.3 | 9.4 |
| f | 6.29 | 20.63 | 59.31 |
| Bf | 3.83 | 3.83 | 3.83 |
| FNo. | 2.07 | 2.72 | 2.89 |
| 2ω[°] | 84.6 | 28.0 | 10.2 |

TABLE 8-continued

| Example 3 - Specifications (d-line) | | | |
|---|---|---|---|
| | Wide Angle End | Middle | Telephoto End |
| DD[5] | 0.3999 | 16.5201 | 30.3252 |
| DD[11] | 18.2731 | 5.6815 | 0.6199 |
| DD[21] | 2.6233 | 4.1352 | 3.2505 |
| DD[25] | 2.4328 | 6.9102 | 8.9693 |

TABLE 9

| Example 3 - Aspheric Coefficients | | | | |
|---|---|---|---|---|
| Surface No. | 6 | 7 | 13 | 14 |
| KA | 1.0000000E+00 | 8.3444196E−01 | 1.0000000E+00 | 1.0000000E+00 |
| A3 | 0.0000000E+00 | 0.0000000E+00 | 0.0000000E+00 | 0.0000000E+00 |
| A4 | −9.9167090E−04 | −1.3480335E−03 | 4.3958871E−05 | −2.4466894E−04 |
| A5 | 9.3280616E−04 | 1.4364831E−03 | −2.1224510E−04 | −3.8461484E−05 |
| A6 | −4.5723611E−04 | −9.2313695E−04 | 6.8837255E−05 | −6.6248027E−05 |

TABLE 9-continued

| | Example 3 - Aspheric Coefficients | | | |
|---|---|---|---|---|
| A7 | 1.2507602E−04 | 3.4847185E−04 | −2.3673332E−06 | 2.7829108E−05 |
| A8 | −1.7269109E−05 | −7.3592517E−05 | −6.9846258E−06 | 8.0462252E−07 |
| A9 | 1.5374225E−07 | 4.3994024E−06 | 1.9070601E−06 | −2.2180496E−06 |
| A10 | 3.2555257E−07 | 1.7526768E−06 | 2.5580785E−08 | 1.8874099E−07 |
| A11 | −4.3554048E−08 | −4.3967308E−07 | −8.1311435E−08 | 5.7576500E−08 |
| A12 | 8.1189763E−10 | 2.4685955E−08 | 7.0165009E−09 | −7.0522180E−09 |
| A13 | 2.8872573E−10 | 4.2501909E−09 | 1.0586819E−09 | −5.7046659E−10 |
| A14 | −2.6242433E−11 | −7.0474379E−10 | −1.4259749E−10 | 7.9527099E−11 |
| A15 | 7.2104461E−13 | 3.0421509E−11 | | |

| Surface No. | 18 | 19 | 24 | 25 |
|---|---|---|---|---|
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | −5.0073289E−03 | −3.5151880E−03 | 4.2586962E−03 | 2.3995755E−03 |
| A5 | 7.7945414E−03 | 5.9261717E−03 | −7.1163420E−04 | 2.0606475E−03 |
| A6 | −8.2990967E−03 | −5.8298756E−03 | 7.7776986E−04 | −2.5213953E−03 |
| A7 | 4.8007518E−03 | 2.9801767E−03 | −1.2412874E−03 | 1.1017848E−03 |
| A8 | −1.5033298E−03 | −6.9583571E−04 | 8.3133933E−04 | −1.3774859E−04 |
| A9 | 1.8373037E−04 | −1.8981992E−05 | −2.8002315E−04 | −7.0999219E−05 |
| A10 | 3.5687736E−05 | 5.2204106E−05 | 4.1424575E−05 | 3.1709933E−05 |
| A11 | −1.7268535E−05 | −1.0988799E−05 | 2.2868768E−06 | −3.0027412E−06 |
| A12 | 2.4581726E−06 | 6.7840717E−08 | −1.8766225E−06 | −8.2245675E−07 |
| A13 | −4.4695510E−08 | 3.2245967E−07 | 2.7579250E−07 | 2.2132827E−07 |
| A14 | −2.4477291E−08 | −5.1593382E−08 | −1.4281623E−08 | −1.5397021E−08 |
| A15 | 1.9797804E−09 | 2.7203862E−09 | | |

| Surface No. | 26 | 27 |
|---|---|---|
| KA | 1.0000000E+00 | 1.0000000E+00 |
| A3 | 0.0000000E+00 | 0.0000000E+00 |
| A4 | −8.2511069E−03 | −1.0417735E−02 |
| A5 | 1.1547781E−02 | 1.5969045E−02 |
| A6 | −7.2756040E−03 | −1.0830465E−02 |
| A7 | 2.3858111E−03 | 4.0257026E−03 |
| A8 | −3.3768387E−04 | −7.9287309E−04 |
| A9 | −2.5407632E−05 | 4.3703935E−05 |
| A10 | 1.6682819E−05 | 1.4369911E−05 |
| A11 | −2.0333986E−06 | −3.1218516E−06 |
| A12 | −4.3651605E−08 | 1.4906546E−07 |
| A13 | 3.3007801E−08 | 2.2076846E−08 |
| A14 | −2.9847525E−09 | −3.1309370E−09 |
| A15 | 8.9844608E−11 | 1.1735690E−10 |

Next, a zoom lens of Example 4 is described. FIG. 5 shows the lens configuration of the zoom lens of Example 4. Similarly to the zoom lens of Example 1, the third lens group G3 of the zoom lens of this example is formed by four lenses. In the zoom lens of this example, the fourth lens group G4 is formed by one negative fourth-group first lens L41, unlike the other four examples.

Table 10 shows basic lens data of the zoom lens of Example 4, Table 11 shows data about specifications of the zoom lens, and Table 12 shows data about aspheric coefficients of the zoom lens. FIG. 10 shows aberration diagrams of the zoom lens of Example 4.

TABLE 10

| | Example 4 - Lens Data | | | |
|---|---|---|---|---|
| Si (Surface No.) | Ri (Radius of Curvature) | Di (Surface Distance) | Ndj (Refractive Index) | νdj (Abbe Number) |
| 1 | 118.9514 | 1.1100 | 1.91082 | 35.25 |
| 2 | 34.1809 | 6.8480 | 1.59282 | 68.63 |
| 3 | −262.5234 | 0.1000 | | |
| 4 | 33.0235 | 4.8083 | 1.69680 | 55.53 |
| 5 | 147.2183 | DD[5] | | |
| *6 | 50.7463 | 0.7000 | 1.85135 | 40.10 |
| *7 | 7.0323 | 5.2000 | | |
| 8 | −20.2361 | 0.7000 | 1.88100 | 40.14 |
| 9 | 383.8850 | 0.1000 | | |
| 10 | 27.0189 | 2.1998 | 1.95906 | 17.47 |
| 11 | −82.7255 | DD[11] | | |
| 12 (aperture stop) | ∞ | 2.3000 | | |
| *13 | 11.5440 | 3.5000 | 1.80610 | 40.73 |
| *14 | 74.0108 | 0.1000 | | |
| 15 | 14.2491 | 3.2740 | 1.49700 | 81.54 |
| 16 | −79.7350 | 0.5000 | 1.80518 | 25.42 |

TABLE 10-continued

Example 4 - Lens Data

| Si (Surface No.) | Ri (Radius of Curvature) | Di (Surface Distance) | Ndj (Refractive Index) | vdj (Abbe Number) |
|---|---|---|---|---|
| 17 | 8.1859 | 1.7500 | | |
| *18 | 12.0576 | 4.3389 | 1.55332 | 71.68 |
| *19 | −11.1797 | DD[19] | | |
| *20 | 50.4826 | 0.7000 | 1.69680 | 55.46 |
| *21 | 11.1595 | DD[21] | | |
| *22 | 168.0488 | 3.4568 | 1.73077 | 40.50 |
| *23 | −23.9873 | 2.0000 | | |
| 24 | ∞ | 1.5000 | 1.51680 | 64.20 |
| 25 | ∞ | 1.0700 | | |

TABLE 11

Example 4 - Specifications (d-line)

| | Wide Angle End | Middle | Telephoto End |
|---|---|---|---|
| Zoom Magnification | 1.0 | 3.7 | 11.8 |
| f' | 6.29 | 23.21 | 74.11 |
| Bf' | 4.06 | 4.06 | 4.06 |
| FNo. | 2.89 | 2.89 | 2.89 |
| 2ω[°] | 86.0 | 25.2 | 8.2 |
| DD[5] | 0.3998 | 21.5032 | 36.8362 |
| DD[11] | 20.9634 | 5.4323 | 0.8009 |
| DD[19] | 4.2302 | 4.7662 | 0.6129 |
| DD[21] | 2.2749 | 8.1898 | 17.5565 |

TABLE 12

Example 4 - Aspheric Coefficients

| Surface No. | 6 | 7 | 13 | 14 |
|---|---|---|---|---|
| KA | 1.0000000E+00 | −2.3349809E−01 | 1.0000000E+00 | 1.0000000E+00 |
| A3 | 0.0000000E+00 | 0.0000000E+00 | 0.0000000E+00 | 0.0000000E+00 |
| A4 | 1.2825304E−05 | 2.7086190E−04 | −1.2622651E−04 | −1.3962311E−04 |
| A5 | −7.8085058E−06 | 5.4702442E−05 | 2.1794843E−05 | 3.3183902E−05 |
| A6 | −1.7786262E−06 | −2.8122511E−05 | −4.0880463E−06 | −4.0273441E−06 |
| A7 | 3.6678329E−07 | 5.2355782E−06 | −1.0527320E−07 | 2.4346957E−07 |
| A8 | −1.2927649E−08 | −7.1954727E−08 | 1.5888733E−07 | −5.6599627E−09 |
| A9 | −5.4536453E−10 | −7.6695831E−08 | −3.6233252E−09 | 1.5266823E−08 |
| A10 | −5.7205077E−11 | −2.7421191E−10 | −4.6621623E−09 | 2.3893256E−09 |
| A11 | 1.2522615E−11 | 1.7599480E−09 | 6.3978275E−10 | −1.2695238E−09 |
| A12 | −5.0198804E−13 | −1.2395980E−10 | −1.5195562E−11 | 1.2502278E−10 |

| Surface No. | 18 | 19 | 20 | 21 |
|---|---|---|---|---|
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | −4.1471990E−04 | −2.2698395E−05 | −1.0217377E−03 | −1.1927193E−03 |
| A5 | 3.9635342E−05 | 1.4286123E−06 | 7.3200900E−05 | 1.1356867E−04 |
| A6 | −9.6823531E−06 | 1.7262095E−06 | 2.7085958E−05 | 1.2963287E−05 |
| A7 | 1.3151805E−06 | −9.2435001E−07 | 5.6063553E−07 | 2.7050713E−06 |
| A8 | 1.1687320E−07 | −1.0569312E−07 | −6.9262902E−07 | −8.9891623E−08 |
| A9 | −6.6017591E−08 | 5.0538828E−08 | −1.0483010E−07 | −3.5367283E−07 |
| A10 | 6.4438433E−09 | −5.0218638E−09 | 2.3594070E−08 | 4.8554158E−08 |

| Surface No. | 22 | 23 |
|---|---|---|
| KA | 1.0000000E+00 | 1.0000000E+00 |
| A3 | 0.0000000E+00 | 0.0000000E+00 |
| A4 | −9.3994838E−05 | 3.7545164E−04 |
| A5 | −2.4112095E−11 | −7.3964773E−05 |
| A6 | −8.1920008E−07 | 2.6692327E−06 |
| A7 | −1.2246957E−06 | 2.9382396E−07 |
| A8 | 2.0315204E−08 | −1.1992433E−07 |
| A9 | 3.4554389E−08 | −2.3366760E−08 |
| A10 | −4.6123582E−09 | 3.3112825E−09 |

Figure 6:
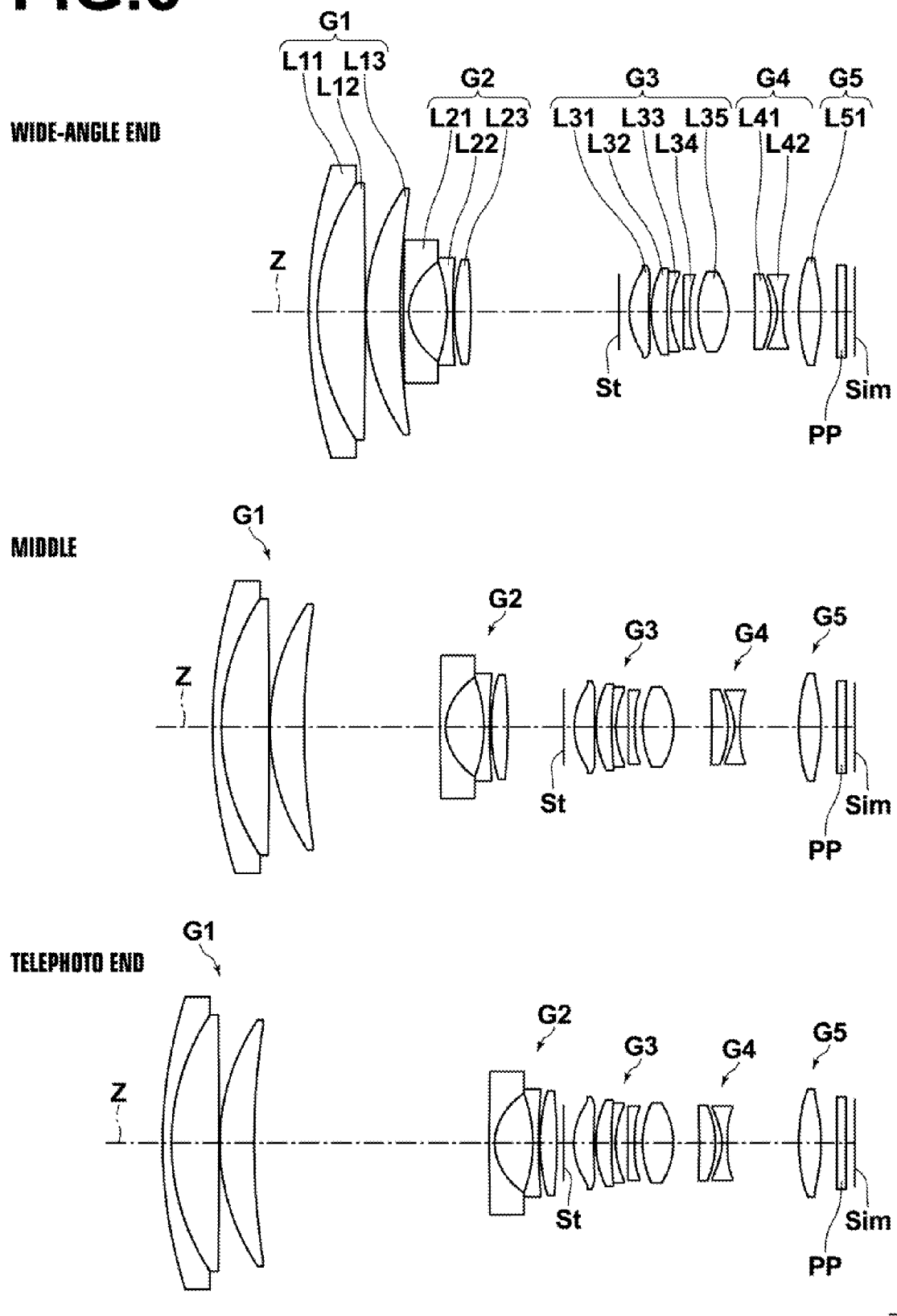
FIG. 6 is a sectional view illustrating the lens configuration of a zoom lens of Example 5 of the invention.

Next, a zoom lens of Example 5 is described. FIG. 6 shows the lens configuration of the zoom lens of Example 5.

Table 13 shows basic lens data of the zoom lens of Example 5, Table 14 shows data about specifications of the zoom lens, and Table 15 shows data about aspheric coefficients of the zoom lens. FIG. 11 shows aberration diagrams of the zoom lens of Example 5.

TABLE 13

Example 5 - Lens Data

| Si (Surface No.) | Ri (Radius of Curvature) | Di (Surface Distance) | Ndj (Refractive Index) | vdj (Abbe Number) |
|---|---|---|---|---|
| 1 | 64.7831 | 1.1098 | 2.00100 | 29.13 |
| 2 | 31.1028 | 5.9998 | 1.59282 | 68.63 |
| 3 | −1101.8466 | 0.0999 | | |
| 4 | 29.4153 | 4.2999 | 1.74100 | 52.64 |
| 5 | 106.3868 | DD[5] | | |
| *6 | 109.6711 | 0.6998 | 1.85135 | 40.10 |
| *7 | 6.6001 | 4.8002 | | |
| 8 | −19.2307 | 0.7248 | 1.88100 | 40.14 |
| 9 | 89.0817 | 0.2002 | | |
| 10 | 25.7180 | 2.0756 | 1.95906 | 17.47 |
| 11 | −74.0665 | DD[11] | | |
| 12 (aperture stop) | ∞ | 1.3000 | | |
| *13 | 9.0244 | 2.5279 | 1.68893 | 31.08 |
| *14 | 249.9818 | 0.2384 | | |
| 15 | 13.1272 | 1.9801 | 1.48749 | 70.23 |
| 16 | 67.1680 | 0.4998 | 2.00272 | 19.32 |
| 17 | 11.4878 | 1.5874 | | |
| *18 | −74.2412 | 0.8001 | 1.82115 | 24.06 |
| *19 | 59.4877 | 1.0002 | | |
| 20 | 12.6832 | 3.8566 | 1.49700 | 81.54 |
| 21 | −10.0072 | DD[21] | | |
| 22 | −125.1482 | 2.0089 | 1.58144 | 40.75 |
| 23 | −12.1282 | 0.8200 | | |
| *24 | −5.8602 | 0.7000 | 1.82080 | 42.71 |
| *25 | 260.0013 | DD[25] | | |
| *26 | 20.0121 | 2.7999 | 1.80139 | 45.45 |
| *27 | −24.9998 | 2.0000 | | |
| 28 | ∞ | 1.1000 | 1.51680 | 64.20 |
| 29 | ∞ | 1.1172 | | |

TABLE 14

Example 5 - Specifications (d-line)

| | Wide Angle End | Middle | Telephoto End |
|---|---|---|---|
| Zoom Magnification | 1.0 | 3.7 | 11.8 |
| f′ | 6.30 | 23.24 | 74.18 |
| Bf | 3.84 | 3.84 | 3.84 |
| FNo. | 2.05 | 2.84 | 2.88 |
| 2ω[°] | 85.4 | 25.2 | 8.2 |
| DD[5] | 0.3998 | 17.1053 | 29.5519 |
| DD[11] | 18.6107 | 7.0518 | 0.8467 |
| DD[21] | 3.2922 | 4.8216 | 3.2931 |
| DD[25] | 2.0000 | 7.3916 | 8.9577 |

TABLE 15

Example 5 - Aspheric Coefficients

| Surface No. | 6 | 7 | 13 | 14 |
|---|---|---|---|---|
| KA | 1.0000000E+00 | 4.2154454E−01 | 1.0000000E+00 | 1.0000000E+00 |
| A3 | −1.2057957E−17 | 2.2237999E−17 | 4.7908429E−19 | −4.6303460E−19 |
| A4 | −1.0249003E−03 | −1.2060965E−03 | 9.6511147E−05 | −2.7640832E−05 |
| A5 | 9.4610615E−04 | 1.4521337E−03 | −2.1005387E−04 | 6.3789093E−05 |
| A6 | −4.5705579E−04 | −9.1422464E−04 | 9.0053790E−05 | −7.2213420E−05 |
| A7 | 1.2490376E−04 | 3.4764267E−04 | −4.7302047E−06 | 2.8266803E−05 |
| A8 | −1.7279686E−05 | −7.3828856E−05 | −7.3783985E−06 | 6.2923394E−07 |
| A9 | 1.5410482E−07 | 4.4260352E−06 | 1.9835900E−06 | −2.1663839E−06 |
| A10 | 3.2572581E−07 | 1.7599136E−06 | 4.3816788E−08 | 1.9661523E−07 |
| A11 | −4.3539699E−08 | −4.3912469E−07 | −8.2817458E−08 | 5.8790926E−08 |
| A12 | 8.1136690E−10 | 2.4509932E−08 | 6.8059646E−09 | −8.0635248E−09 |
| A13 | 2.8864168E−10 | 4.2330047E−09 | 1.0959477E−09 | −5.1428442E−10 |

TABLE 15-continued

Example 5 - Aspheric Coefficients

| | | | | |
|---|---|---|---|---|
| A14 | −2.6266337E−11 | −7.0643466E−10 | −1.4432454E−10 | 8.1335910E−11 |
| A15 | 7.2295141E−13 | 3.1147765E−11 | | |

| Surface No. | 18 | 19 | 24 | 25 |
|---|---|---|---|---|
| KA | 1.0000000E+00 | 1.0000000E+00 | 1.0000000E+00 | 1.0000000E+00 |
| A3 | −2.0458451E−16 | 1.0163470E−17 | −5.5442648E−17 | −2.5402009E−17 |
| A4 | −2.8980293E−03 | −1.6717600E−03 | 5.1536867E−03 | 2.7299722E−03 |
| A5 | 8.0225905E−03 | 5.9909673E−03 | −9.3489370E−04 | 2.4229348E−03 |
| A6 | −8.4588986E−03 | −5.8465846E−03 | 8.6952639E−04 | −3.0680909E−03 |
| A7 | 4.8887981E−03 | 2.9796720E−03 | −1.3648231E−03 | 1.3604732E−03 |
| A8 | −1.5373525E−03 | −6.9993383E−04 | 9.2099300E−04 | −1.7068936E−04 |
| A9 | 1.8710345E−04 | −1.9468812E−05 | −3.1080406E−04 | −8.7758621E−05 |
| A10 | 3.6499297E−05 | 5.2237753E−05 | 4.5789122E−05 | 3.8941704E−05 |
| A11 | −1.7597582E−05 | −1.0934506E−05 | 2.5269551E−06 | −3.6825566E−06 |
| A12 | 2.5089308E−06 | 7.0797280E−08 | −2.0669972E−06 | −1.0051710E−06 |
| A13 | −4.7273665E−08 | 3.2009024E−07 | 3.0763884E−07 | 2.7284187E−07 |
| A14 | −2.5112525E−08 | −5.1935543E−08 | −1.6425820E−08 | −1.9198067E−08 |
| A15 | 2.0854934E−09 | 2.8120416E−09 | | |

| Surface No. | 26 | 27 |
|---|---|---|
| KA | 1.0000000E+00 | 1.0000000E+00 |
| A3 | −7.2197622E−16 | −2.2868903E−16 |
| A4 | −8.6306366E−03 | −1.1431415E−02 |
| A5 | 1.1992403E−02 | 1.7030404E−02 |
| A6 | −7.6025525E−03 | −1.1463966E−02 |
| A7 | 2.5051015E−03 | 4.2416983E−03 |
| A8 | −3.5596664E−04 | −8.3376563E−04 |
| A9 | −2.6665483E−05 | 4.5991187E−05 |
| A10 | 1.7579225E−05 | 1.5119243E−05 |
| A11 | −2.1397499E−06 | −3.2869655E−06 |
| A12 | −4.6178492E−08 | 1.5689086E−07 |
| A13 | 3.4697513E−08 | 2.3255693E−08 |
| A14 | −3.1458846E−09 | −3.2946453E−09 |
| A15 | 9.5795117E−11 | 1.2338311E−10 |

Table 16 shows values for conditions corresponding to the numerical ranges defined by the condition expressions (1) to (8), i.e., values corresponding to the literal expressions in the condition expressions (1) to (8), for each of Examples 1 to 5. Table 16 also shows a focal length of each lens group relating to the condition expressions (1) to (8). In all the examples, the d-line is used as a reference wavelength, and the values shown in Table 16 below are with respect to the reference wavelength.

TABLE 16

| No. | Condition | Example 1 | Example 2 | Example 3 | Example 4 | Example 5 |
|---|---|---|---|---|---|---|
| | f1 | 56.554 | 47.569 | 51.083 | 57.610 | 46.855 |
| | f2 | −9.458 | −8.572 | −8.825 | −10.372 | −8.173 |
| | f3 | 13.922 | 13.002 | 12.160 | 13.429 | 12.773 |
| | f4 | −13.791 | −11.509 | −9.793 | −20.712 | −10.473 |
| (1) | vdD − vdA | 50.48 | 50.46 | 50.46 | 30.95 | 50.46 |
| (2) | vdB − vdC | 54.03 | 50.92 | 50.92 | 56.12 | 50.92 |
| (3) | vdB − vdA | 50.46 | 39.16 | 39.16 | 40.81 | 39.16 |
| (4) | fT/f4 | −4.299 | −6.441 | −6.056 | −3.578 | −7.083 |
| (5) | f1/f2 | −5.979 | −5.549 | −5.788 | −5.555 | −5.733 |
| (6) | f1/f3 | 4.062 | 3.659 | 4.201 | 4.290 | 3.668 |
| (7) | f3/RCr | 1.348 | 1.377 | 1.021 | 1.641 | 1.112 |
| (8) | (fD × vdD)/(fA × vdA) | 1.338 | 2.451 | 2.347 | 1.194 | 2.313 |

The above-described zoom lenses of the invention have a high magnification, a wide angle of view with a total angle of view of at least 80° at the wide-angle end, and a small f-number of 3.0 or less at the telephoto end.

It should be noted that the zoom lenses of Example 1 to 5 show examples of design data where the total angle of view at the wide-angle end is in the range from 82.4° to 86.0°, and the f-number at the telephoto end is in the range from 2.88 to 2.89.

Figure 12A:
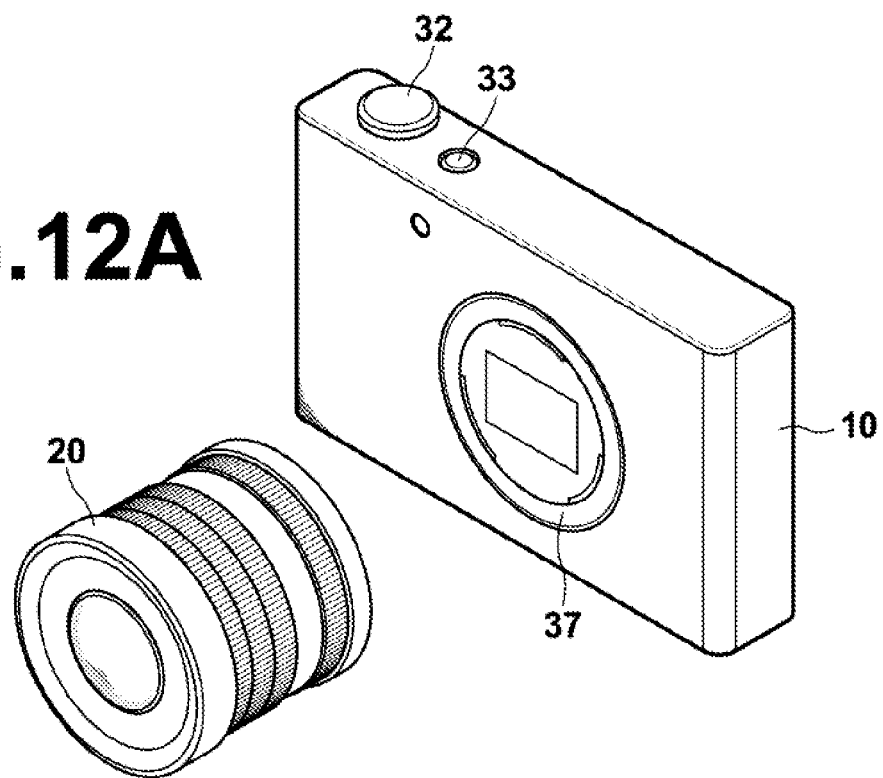
FIGS. 12A and 12B are diagrams illustrating the schematic configuration of an imaging apparatus according to an embodiment of the invention.
Figure 12B:
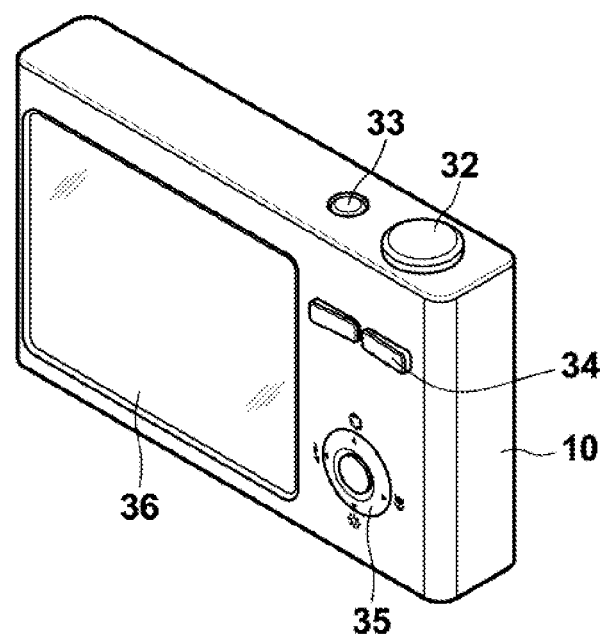

Next, an imaging apparatus according to an embodiment of the invention is described. FIGS. 12A and 12B show, as one example of the imaging apparatus of the embodiment of the invention, the appearance of one configuration example of a mirrorless single-lens camera employing the zoom lens of the embodiment of the invention.

Specifically, FIG. 12A shows the appearance of the camera viewed from the front side, and FIG. 12B shows the appearance of the camera viewed from the rear side. The camera includes a camera body 10, and a release button 32 and a power button 33 disposed on the upper side of the camera body 10. A display section 36 and operation sections 34 and 35 are disposed on the rear side of the camera body 10. The display section 36 displays taken images.

At the center of the front side of the camera body 10, an imaging aperture, through which light from the subject enters, is formed, and a mount 37 is disposed at a position corresponding to the imaging aperture. A replaceable lens 20 is mounted on the camera body 10 via the mount 37. The replaceable lens 20 is formed by a lens member contained in a lens barrel. In the camera body 10, an image sensor, such as a CCD, for outputting an image signal according to an image of the subject formed by the replaceable lens 20, a signal processing circuit for processing the image signal outputted from the image sensor to generate an image, a recording medium for recording the generated image, etc., are disposed. With this camera, a still image of one frame is taken when the release button 32 is pressed, and the image data obtained by the imaging operation is recorded in the recording medium (not shown) in the camera body 10.

This camera uses the zoom lens according to the invention as the replaceable lens 20, and therefore can obtain high magnification and wide angle images, and bright high magnification images.

The present invention has been described with reference to the embodiments and the examples. However, the invention is not limited to the above-described embodiments and examples, and various modifications may be made to the invention. For example, the values of the radius of curvature, the surface distance, the refractive index, the Abbe number, etc., of each lens element are not limited to the values shown in the above-described numerical examples and may take different values.

What is claimed is:

1. A zoom lens consisting of, in order from an object side, a first lens group having a positive refractive power, a second lens group having a negative refractive power, a stop, a third lens group having a positive refractive power, a fourth lens group having a negative refractive power, and a fifth lens group having a positive refractive power,
wherein, during magnification change from a wide-angle end to a telephoto end, at least the first to the fourth lens groups are moved such that a distance between the first lens group and the second lens group always increases, a distance between the second lens group and the third lens group always decreases, and a distance between the third lens group and the fourth lens group and a distance between the fourth lens group and the fifth lens group are changed,
the first lens group consists of, in order from the object side, a meniscus lens having a negative refractive power with a concave surface toward an image side, a lens having a positive refractive power, and a lens having a positive refractive power,
the third lens group includes at least four lenses including a lens A having a positive refractive power disposed at the most object-side position, a lens B having a positive refractive power disposed next to and on the image side of the lens A, a lens C having a negative refractive power with a concave surface toward the image side, the lens C being disposed next to and on the image side of the lens B, and a lens D having a positive refractive power and disposed at the most image-side position, and
the condition expression (1) below is satisfied:

$$25 < vdD - vdA < 70 \quad (1),$$

where vdA is an Abbe number with respect to the d-line of the lens A, and vdD is an Abbe number with respect to the d-line of the lens D, and
wherein the condition expression (3) below is satisfied:

$$35 < vdB - vdA < 70 \quad (3),$$

where vdA is an Abbe number with respect to the d-line of the lens A, and vdB is an Abbe number with respect to the d-line of the lens B.

2. The zoom lens as claimed in claim 1, wherein the condition expression (2) below is satisfied:

$$35 < vdB - vdC < 70 \quad (2),$$

where vdB is an Abbe number with respect to the d-line of the lens B, and vdC is an Abbe number with respect to the d-line of the lens C.

3. The zoom lens as claimed in claim 2, wherein the condition expression (2-1) below is satisfied:

$$40 < vdB - vdC < 60 \quad (2-1),$$

where vdB is an Abbe number with respect to the d-line of the lens B, and vdC is an Abbe number with respect to the d-line of the lens C.

4. The zoom lens as claimed in claim 1, wherein the most object-side lens surface of the second lens group is convex toward the object side.

5. The zoom lens as claimed in claim 1, wherein the fourth lens group functions as a focusing lens group.

6. The zoom lens as claimed in claim 5, wherein the condition expression (4) below is satisfied:

$$-9.0 < fT/f4 < -2.0 \quad (4),$$

where fT is a focal length of the entire system at the telephoto end, and f4 is a focal length of the fourth lens group.

7. The zoom lens as claimed in claim 6, wherein the condition expression (4-1) below is satisfied:

$$-7.5 < fT/f4 < -3.0 \quad (4-1),$$

where fT is a focal length of the entire system at the telephoto end, and f4 is a focal length of the fourth lens group.

8. The zoom lens as claimed in claim 1, wherein a distance between the third lens group and the fourth lens group at the telephoto end is greater than a distance between the third lens group and the fourth lens group at the wide-angle end.

9. The zoom lens as claimed in claim 1, wherein a distance between the fourth lens group and the fifth lens group at the telephoto end is greater than a distance between the fourth lens group and the fifth lens group at the wide-angle end.

10. The zoom lens as claimed in claim 1, wherein the condition expression (5) below is satisfied:

$$-8 < f1/f2 < -4 \quad (5),$$

where f1 is a focal length of the first lens group, and f2 is a focal length of the second lens group.

11. The zoom lens as claimed in claim 10, wherein the condition expression (5-1) below is satisfied:

$$-7 < f1/f2 < -5 \quad (5-1),$$

where f1 is a focal length of the first lens group, and f2 is a focal length of the second lens group.

12. The zoom lens as claimed in claim 1, wherein the condition expression (6) below is satisfied:

$$2.5 < f1/f3 < 8 \quad (6),$$

where f1 is a focal length of the first lens group, and f3 is a focal length of the third lens group.

13. The zoom lens as claimed in claim 12, wherein the condition expression (6-1) below is satisfied:

$$3 < f1/f3 < 6 \quad (6-1),$$

where f1 is a focal length of the first lens group, and f3 is a focal length of the third lens group.

14. The zoom lens as claimed in claim 1, wherein the condition expression (7) below is satisfied:

$$0.7 < f3/RCr < 2.5 \quad (7),$$

where f3 is a focal length of the third lens group, and RCr is a paraxial radius of curvature of the image-side surface of the lens C.

15. The zoom lens as claimed in claim 14, wherein the condition expression (7-1) below is satisfied:

$$0.8 < f3/RCr < 2 \quad (7-1)$$

where f3 is a focal length of the third lens group, and RCr is a paraxial radius of curvature of the image-side surface of the lens C.

16. The zoom lens as claimed in claim 1, wherein the condition expression (8) below is satisfied:

$$1.0 < (fD \times vdD)/(fA \times vdA) < 3.0 \qquad (8),$$

where fA is a focal length of the lens A, fD is a focal length of the lens D, vdA is an Abbe number with respect to the d-line of the lens A, and vdD is an Abbe number with respect to the d-line of the lens D.

17. The zoom lens as claimed in claim 1, wherein the condition expression (1-1) below is satisfied:

$$27 < vdD - vdA < 60 \qquad (1\text{-}1),$$

where vdA is an Abbe number with respect to the d-line of the lens A, and vdD is an Abbe number with respect to the d-line of the lens D.

18. The zoom lens as claimed in claim 1, wherein the condition expression (3-1) below is satisfied:

$$37 < vdB - vdA < 60 \qquad (3\text{-}1),$$

where vdA is an Abbe number with respect to the d-line of the lens A, and vdB is an Abbe number with respect to the d-line of the lens B.

19. An imaging apparatus comprising the zoom lens as claimed in claim 1.

* * * * *